(12) United States Patent
Yen et al.

(10) Patent No.: US 10,713,178 B2
(45) Date of Patent: Jul. 14, 2020

(54) MAPPING TABLE UPDATING METHOD, MEMORY CONTROLLING CIRCUIT UNIT AND MEMORY STORAGE DEVICE

(71) Applicant: PHISON ELECTRONICS CORP., Miaoli (TW)

(72) Inventors: Chia-Han Yen, Taipei (TW); Chuan-Hsiang Chen, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/238,529

(22) Filed: Jan. 3, 2019

(65) Prior Publication Data

US 2020/0151108 A1 May 14, 2020

(30) Foreign Application Priority Data

Nov. 13, 2018 (TW) .............................. 107140233 A

(51) Int. Cl.
*G06F 12/00* (2006.01)
*G06F 12/1009* (2016.01)

(52) U.S. Cl.
CPC .... *G06F 12/1009* (2013.01); *G06F 2212/657* (2013.01)

(58) Field of Classification Search
CPC ........................ G06F 12/1009; G06F 2212/657
See application file for complete search history.

(56) References Cited

U.S. PATENT DOCUMENTS 8,966,157 B2 * 2/2015 Yeh ...................... G06F 12/0246
711/103
2013/0326121 A1 * 12/2013 Cheng ................. G06F 12/0246
711/103

(Continued)

FOREIGN PATENT DOCUMENTS

CN 107844431 3/2018
TW I569139 2/2017

OTHER PUBLICATIONS

"Garbage Collection for Low Performance Variation in NAND Flash Storage Systems" by Sanghyuk Jung and Yong Ho Song, IEEE, Dec. 17, 2014, http://www.ieee.org/publications_standards/publications/rights/index.html (Year: 2014).*

(Continued)

*Primary Examiner* — Jing-Yih Shyu
(74) *Attorney, Agent, or Firm* — JCIPRNET

(57) ABSTRACT

A mapping table updating method, a memory controlling circuit unit, and a memory storage device are provided. The method includes: calculating a plurality of updated data counts of a plurality of updated logical units in at least one active physical erasing unit respectively according to a physical-logical mapping table; selecting a first updated logical unit from a plurality of updated logical units according to the plurality of updated data counts, and the number of the first updated logical unit is less than the number of the plurality of updated logical units; loading a first logical-physical mapping table corresponding to the first updated logical unit; and updating mapping information in the first logical-physical mapping table according to mapping information of the first updated logical unit in the physical-logical mapping table.

19 Claims, 15 Drawing Sheets

(56) References Cited

U.S. PATENT DOCUMENTS

| | | | |
|---|---|---|---|
| 2014/0082265 A1* | 3/2014 | Cheng | G06F 12/0246 711/103 |
| 2015/0067233 A1* | 3/2015 | Cheng | G06F 12/0246 711/103 |
| 2016/0004468 A1* | 1/2016 | Cheng | G06F 12/0246 711/103 |
| 2017/0039141 A1* | 2/2017 | Yeh | G06F 3/0679 |
| 2017/0083452 A1* | 3/2017 | Klein | G06F 12/1027 |
| 2017/0220273 A1* | 8/2017 | Yang | G06F 3/0619 |

OTHER PUBLICATIONS

"Office Action of Taiwan Counterpart Application," dated Dec. 31, 2019, p. 1-p. 6.

* cited by examiner

| Lower physical programming unit | Middle physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

FIG. 5B

| Physical address | Logical address |
|---|---|
| 410(4)-0 | LBA(0)-1 |
| 410(4)-1 | LBA(2)-1 |
| 410(4)-2 | LBA(2)-2 |
| 410(5)-0 | LBA(3)-1 |
| 410(5)-1 | LBA(3)-2 |
| 410(5)-2 | LBA(1)-1 |

| Logical unit | Updated data count |
|---|---|
| LBA(0) | 1 |
| LBA(1) | 1 |
| LBA(2) | 2 |
| LBA(3) | 2 |

| Physical address | Logical address |
|---|---|
| 410(4)-0 | LBA(0)-1 |
|  |  |
|  |  |
|  |  |
|  |  |
| 410(5)-2 | LBA(1)-1 |

| Logical unit | Updated data count |
|---|---|
| LBA(0) | 1 |
| LBA(1) | 1 |
| LBA(2) | 0 |
| LBA(3) | 0 |

| Physical address | Logical address |
|---|---|
|  |  |
| 410(4)-1 | LBA(2)-1 |
| 410(4)-2 | LBA(2)-2 |
| 410(5)-0 | LBA(3)-1 |
| 410(5)-1 | LBA(3)-2 |
|  |  |

| Logical unit | Updated data count |
|---|---|
| LBA(0) | 0 |
| LBA(1) | 0 |
| LBA(2) | 2 |
| LBA(3) | 2 |

MAPPING TABLE UPDATING METHOD, MEMORY CONTROLLING CIRCUIT UNIT AND MEMORY STORAGE DEVICE

CROSS-REFERENCE TO RELATED APPLICATION

This application claims the priority benefit of Taiwan application serial no. 107140233, filed on Nov. 13, 2018. The entirety of the above-mentioned patent application is hereby incorporated by reference herein and made a part of this specification.

BACKGROUND

Technical Field

The present disclosure relates to a mapping table updating method, a memory controlling circuit unit, and a memory storage device.

Description of Related Art

Digital cameras, mobile phones and MP3 players have been developed rapidly for the past few years, and consumers' needs for storage media have grown significantly as well. Since a rewritable non-volatile memory is characterized in data non-volatility, power saving, minimized size, non-mechanical structure, fast reading/writing speed, it is highly suitable to be used for portable electronic products such as notebook computer. Solid state drive is a memory storage device using flash memory as storage medium. Therefore, flash memory industry has become prosperous among electronic industries in recent years.

Flash memory module has a plurality of physical erasing units, and each of the physical erasing units has a plurality of physical programming units, wherein it is required to write data according to the sequence of physical programming unit when writing data into the physical erasing unit. Additionally, the physical programming unit into which data is written needs to be erased first in order to be written with data. In particular, physical erasing unit is the minimum unit for erasing operation, and physical programming unit is the minimum unit for programming operation (also referred to as writing operation). Accordingly, in management of flash memory module, physical erasing unit is classified into data area and free area.

Physical erasing unit in data area is used for storing data from host system. Specifically, a memory management circuit in memory storage device converts logical access address accessed by host system into logical page of logical block and maps the logical page of the logical block to physical programming unit of the physical erasing unit in data area. In other words, the physical erasing unit in data area in management of flash memory module is regarded as physical erasing unit that has been used (e.g., stores the data written by host system). For example, a memory management circuit unit uses a logical-physical address mapping table to record the mapping relationship between logical page and physical programming unit in the data area.

The physical erasing unit in free area is used to replace the physical erasing unit in the data area. Specifically, as mentioned above, the physical erasing unit that is written with data needs to be erased first to be written with data again; therefore, the physical erasing unit in the free area is designed to be written with data to replace the physical erasing unit of the mapped logical block. Accordingly, the physical erasing unit in the free area is empty or usable physical erasing unit to be written with data.

In a typical write operation, after the data is written to the physical erasing unit in the free area, the memory management circuit in the memory storage device does not immediately change the mapping relationship between the logical page in the logical-physical mapping table and the physical programming unit, but stores the mapping information corresponding to the write operation by using a physical-logical mapping table stored in the buffer memory. Specifically, in a write operation, the memory management circuit writes the updated data to a physical erasing unit (also referred to as an active physical erasing unit) in the free area, and records the mapping information between the logical page for this write operation and the physical programming unit for storing the updated data. At an appropriate timing, for example, when the host system is in an idle time or the physical-logical mapping table is full, the memory management circuit loads the corresponding logical-physical mapping table according to the mapping information in the physical-logical mapping table to update the mapping information between the logical page and the physical programming unit. Thereafter, the memory management circuit stores the updated logical-physical mapping table back to the rewritable non-volatile memory. The above operation of updating the logical-physical mapping table according to the mapping information in the physical-logical mapping table is also referred to as a "flush operation".

However, in a conventional flush operation, when there is very little mapping information required to be updated in a loaded logical-physical mapping table (for example, only the mapping information between one logical page and physical programming unit needs to be updated), usually the efficiency of updating mapping information is decreased as a result. In more detail, if the above operations are performed repeatedly, a large amount of time is spent on performing the loading and restoring the logical-physical mapping table, and only a small amount of time is actually used to perform update of mapping information. Therefore, it is an issue to be deal with by practitioners of the field to increase the efficiency of updating the logical-physical mapping table.

SUMMARY

The disclosure provides a mapping table updating method, a memory controlling circuit unit and a memory storage device, which can improve the efficiency of updating logical-physical mapping table.

The present disclosure provides a mapping table updating method for a rewritable non-volatile memory module, wherein the rewritable non-volatile memory module has a plurality of physical erasing units, a plurality of logical-physical mapping tables are stored in the rewritable non-volatile memory module to record mapping information between a plurality of logical units and the plurality of physical erasing units. The mapping table updating method includes: establishing a physical-logical mapping table, wherein the physical-logical mapping table records mapping information between at least one active physical erasing unit in the plurality of physical erasing units and a plurality of updated logical units of the plurality of logical units; calculating a plurality updated data counts of the plurality of updated logical units in the active physical erasing unit respectively according to the physical-logical mapping table; selecting at least one first updated logical unit from the plurality of updated logical units according to the plurality of updated data counts, wherein the number of the first updated logical units is smaller than the number of the plurality of updated logical units; loading at least one first logical-physical mapping table corresponding to the first updated logical unit from the plurality of logical-physical mapping tables; and updating the mapping information in the first logical-physical mapping table according to the mapping information of the first updated logical unit in the physical-logical mapping table.

The present disclosure provides a memory controlling circuit unit for controlling a rewritable non-volatile memory module, the memory controlling circuit unit includes: a host interface, a memory interface, and a memory management circuit. The host interface is coupled to a host system. The memory interface is coupled to the rewritable non-volatile memory module, wherein the rewritable non-volatile memory module has a plurality of physical erasing units, a plurality of logical-physical mapping tables are stored in the rewritable non-volatile memory module to record the mapping information between a plurality of logical units and the plurality of physical erasing units. The memory management circuit is coupled to the host interface and the memory interface. The memory management circuit is configured to perform the following operations: establishing a physical-logical mapping table, wherein the physical-logical mapping table records mapping information between at least one active physical erasing unit in the plurality of physical erasing units and a plurality of updated logical units of the plurality of logical units; calculating a plurality updated data counts of the plurality of updated logical units in the active physical erasing unit respectively according to the physical-logical mapping table; selecting at least one first updated logical unit from the plurality of updated logical units according to the plurality of updated data counts, wherein the number of the first updated logical units is smaller than the number of the plurality of updated logical units; loading at least one first logical-physical mapping table corresponding to the first updated logical unit from the plurality of logical-physical mapping tables; and updating the mapping information in the first logical-physical mapping table according to the mapping information of the first updated logical unit in the physical-logical mapping table.

The disclosure provides a memory storage device. The memory storage device includes a connection interface unit, a rewritable non-volatile memory module and a memory controlling circuit unit. The connection interface unit is coupled to the host system. The rewritable non-volatile memory module has a plurality of physical erasing units, and a plurality of logical-physical mapping tables are stored in the rewritable non-volatile memory module to record mapping information between the plurality of logical units and the plurality of physical erasing units. The memory controlling circuit unit is coupled to the connection interface unit and the rewritable non-volatile memory module. The memory controlling circuit unit is configured to perform the following operations: establishing a physical-logical mapping table, wherein the physical-logical mapping table records mapping information between at least one active physical erasing unit in the plurality of physical erasing units and a plurality of updated logical units of the plurality of logical units; calculating a plurality updated data counts of the plurality of updated logical units in the active physical erasing unit respectively according to the physical-logical mapping table; selecting at least one first updated logical unit from the plurality of updated logical units according to the plurality of updated data counts, wherein the number of the first updated logical units is smaller than the number of the plurality of updated logical units; loading at least one first logical-physical mapping table corresponding to the first updated logical unit from the plurality of logical-physical mapping tables; and updating the mapping information in the first logical-physical mapping table according to the mapping information of the first updated logical unit in the physical-logical mapping table.

The present disclosure provides a mapping table updating method for a rewritable non-volatile memory module, wherein the rewritable non-volatile memory module has a plurality of physical erasing units, and a plurality of logical-physical mapping tables are stored in the rewritable non-volatile memory module to record mapping information between a plurality of logical units and the plurality of physical erasing units. The mapping table updating method includes: establishing a physical-logical mapping table, wherein the physical-logical mapping table records mapping information between at least one active physical erasing unit in the plurality of physical erasing units and a plurality of updated logical units of the plurality of logical units; calculating a plurality updated data counts of the plurality of updated logical units in the active physical erasing unit respectively according to the physical-logical mapping table; selecting at least one first updated logical unit from the plurality of updated logical units according to the plurality of updated data counts, wherein the number of the first updated logical units is smaller than the number of the plurality of updated logical units and a first updated data count of the first updated logical unit in the plurality of updated data counts is larger than a first threshold; loading at least one first logical-physical mapping table corresponding to the first updated logical unit from the plurality of logical-physical mapping tables; and updating the mapping information in the first logical-physical mapping table according to the mapping information of the first updated logical unit in the physical-logical mapping table; clearing the mapping information of the first updated logical unit in the physical-logical mapping table; and retaining the mapping information of other updated logical units excluding the first updated logical unit in the physical-logical mapping table.

Based on the above, the mapping table updating method, the memory controlling circuit unit and the memory storage device of the present disclosure can load the corresponding logical-physical mapping table to perform updating of mapping information according to only a part of the mapping information in the physical-logical mapping table, and retain the remaining mapping information in the physical-logical mapping table. In this manner, the efficiency of updating the logical-physical mapping table can be improved.

In order to make the aforementioned features and advantages of the disclosure more comprehensible, embodiments accompanying figures are described in detail below.

BRIEF DESCRIPTION OF THE DRAWINGS

FIG. 5A and FIG. 5B are schematic diagrams showing examples of a memory cell storage structure and a physical erasing unit according to an exemplary embodiment of the disclosure.

FIG. 9A-FIG. 9C are simplified examples of writing data according to an embodiment of the disclosure.

FIG. 10A-FIG. 10C are simplified examples of updating mapping table according to a first embodiment of the present disclosure.

FIG. 11A-FIG. 11C are simplified examples of updating mapping table according to a second embodiment of the present disclosure.

DESCRIPTION OF EMBODIMENTS

Generally speaking, a memory storage device (also referred to as a memory storage system) includes a rewritable non-volatile memory module and a controller (also referred to as a controlling circuit). Generally, the memory storage device is used along with a host system so that the host system can write the data into the memory storage device or read data from the memory storage device.

Figure 1:
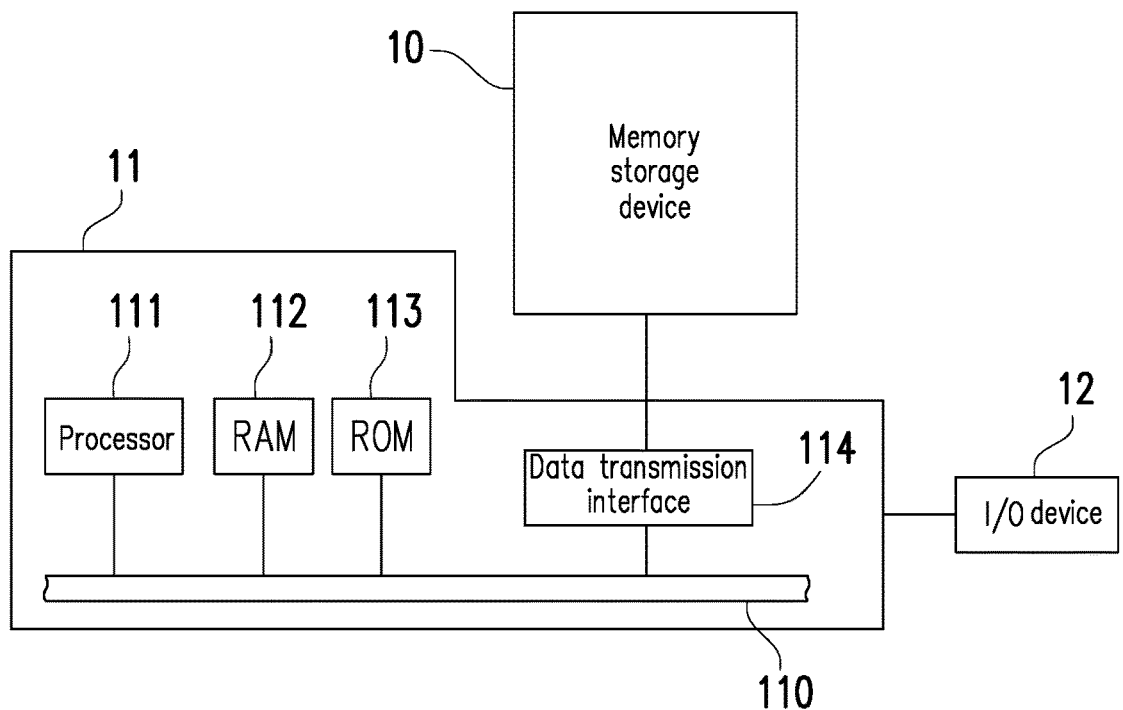
FIG. 1 is a schematic diagram of a host system, a memory storage device, and an input/output (I/O) device according to an exemplary embodiment of the disclosure.
Figure 2:
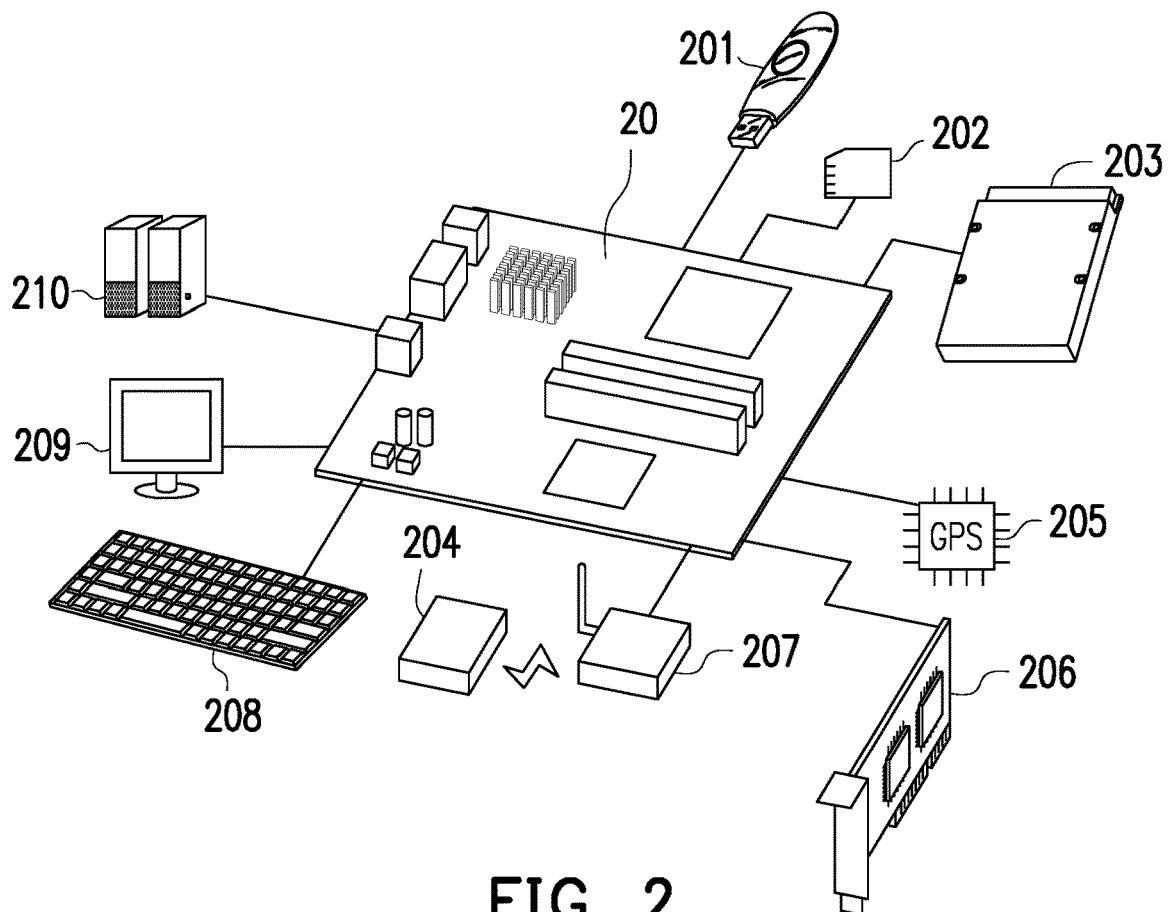
FIG. 2 is a schematic diagram of a host system, a memory storage device, and an input/output (I/O) device according to another exemplary embodiment of the disclosure.

FIG. 1 is a schematic diagram of a host system, a memory storage device and an I/O device according to an exemplary embodiment of the disclosure, and FIG. 2 is a schematic diagram of a host system, a memory storage device and an I/O device according to another exemplary embodiment of the disclosure.

Referring to FIG. 1 and FIG. 2, a host system 11 typically includes a processor 111, a random access memory (RAM) 112, a read-only memory (ROM) 113 and a data transmitting interface 114. The processor 111, the RAM 112, the ROM 113 and the data transmitting interface 114 are coupled to a system bus 110.

In an exemplary embodiment, the host system 11 is coupled to the memory storage device 10 through the data transmitting interface 114. For example, the host system 11 may store the data into the memory storage device 10 or read the data from the memory storage device 10 through the data transmitting interface 114. In addition, the host system 11 is coupled to an I/O device 12 through the system bus 110. For example, the host system 11 may transmit an output signal to the I/O device 12 or receive an input signal from the I/O device 12 through the system bus 110.

In the exemplary embodiment, the processor 111, the RAM 112, the ROM 113 and the data transmitting interface 114 may be disposed on a motherboard 20 of the host system 11. The number of the data transmitting interface 114 may be one or more. With the data transmitting interface 114, the motherboard 20 may be coupled to the memory storage device 10 in a wired or a wireless manner. The memory storage device 10 may be, for example, a flash drive 201, a memory card 202, a solid state drive (SSD) 203 or a wireless memory storage device 204. The wireless memory storage device 204 may be various memory storage devices that use wireless communication technology as basis such as a near field communication storage (NFC) memory storage device, a WiFi memory storage device, a Bluetooth memory storage device or a Bluetooth low energy memory storage device (i.e., iBeacon). In addition, the motherboard 20 may be coupled to various I/O devices such as a global positioning system (GPS) module 205, a network interface card 206, a wireless transmitting device 207, a keyboard 208, a screen 209, a speaker 210 and so on through the system bus 110. For example, in an exemplary embodiment, the motherboard 20 can access the wireless memory storage device 204 through the wireless transmitting device 207.

Figure 3:
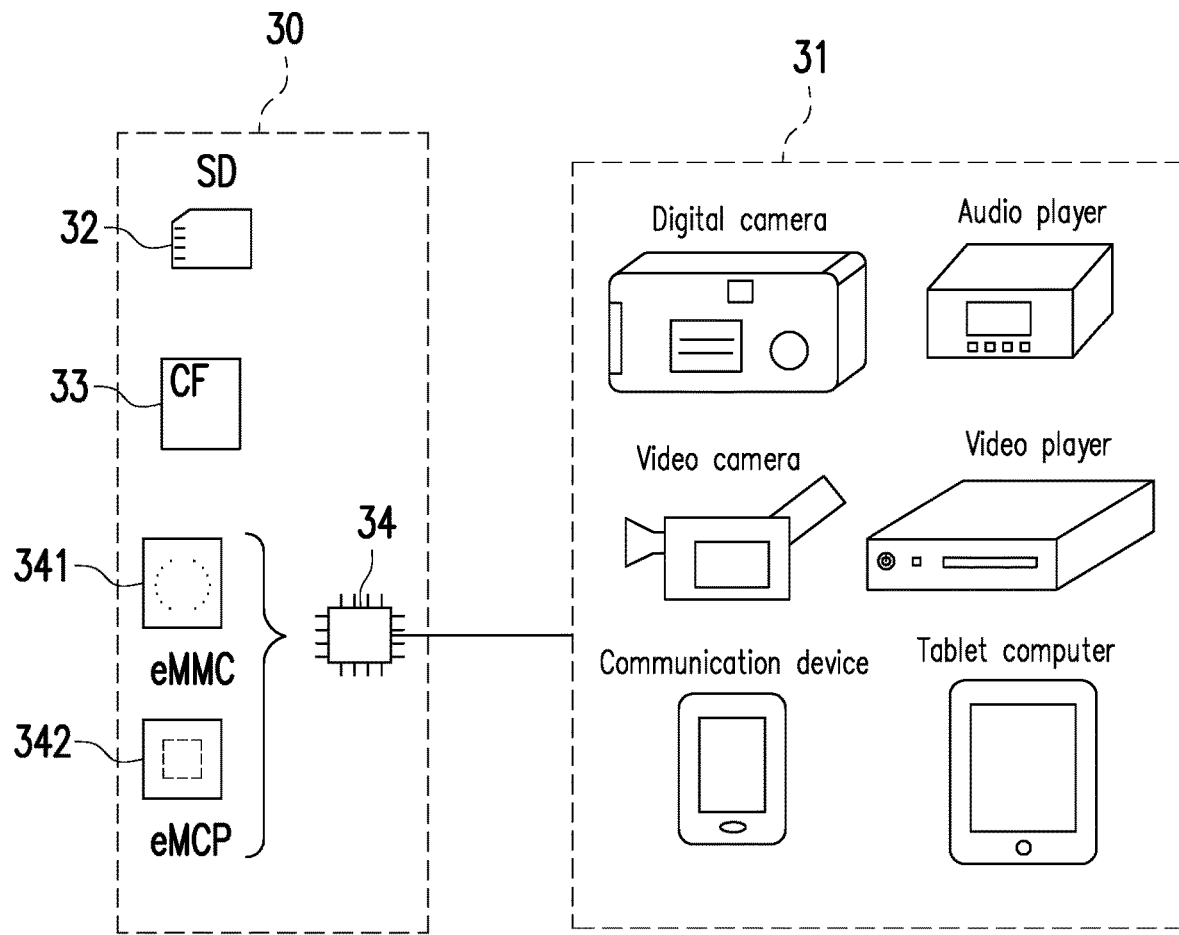
FIG. 3 is a schematic diagram of a host system and a memory storage device according to another exemplary embodiment of the disclosure.

In an exemplary embodiment, the host system may be any system that can substantially cooperate with the memory storage device to store data. In the above-mentioned exemplary embodiment, although the host system is described as a computer system, FIG. 3 is a schematic diagram of a host system and a memory storage device according to another exemplary embodiment of the disclosure. Referring to FIG. 3, in another exemplary embodiment, a host system 31 may be a system such as a digital camera, a camera, a communication device, an audio player, a video player or a tablet PC and so on. The memory storage device 30 may be various non-volatile memory storage devices such as an SD card 32, a CF card 33 or an embedded storage device 34 used therefor. The embedded storage device 34 is a variety of embedded storage devices including an embedded MMC (eMMC) card 341 and/or an embedded multi chip package (eMCP) storage device 342 that directly couples the memory module to the substrate of the host system.

Figure 4:
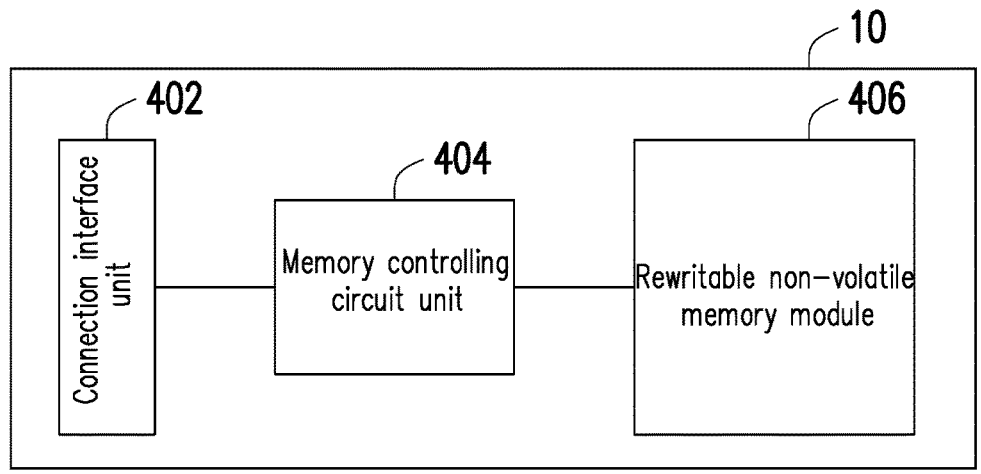
FIG. 4 is a schematic block diagram of a memory storage device according to an exemplary embodiment of the disclosure.

FIG. 4 is a schematic block diagram of a memory storage device according to an exemplary embodiment of the disclosure.

Referring to FIG. 4, the memory storage device 10 includes a connection interface unit 402, a memory controlling circuit unit 404 and a rewritable non-volatile memory module 406.

In the exemplary embodiment, the connection interface unit 402 is compatible with a Serial Advanced Technology Attachment (SATA) standard; however, it should be indicated that the disclosure is not limited thereto. The connection interface unit 402 may also be compatible with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Secure Digital (SD) interface standard, the Ultra High Speed-I (UHS-I) interface standard, the Ultra High Speed-II (UHS-II) interface standard, the Memory Stick (MS) interface standard, the Multi-Chip Package interface standard, the Multi-Media Card (MMC) interface standard, the Embedded Multimedia Card (eMMC) interface standard, the Universal Flash Storage (UFS) interface standard, the embedded Multi Chip Package (eMCP) interface standard, the Compact Flash (CF) interface standard, the Integrated Device Electronics (IDE) standard or other suitable standards. The connection interface unit 402 may be packaged in one chip along with the memory control circuit unit 404, or the connection interface unit 402 is arranged outside a chip that contains the memory controlling circuit unit 404.

The memory controlling circuit unit 404 performs a plurality of logic gates or control commands implemented in the form of hardware of firmware, and writes, reads and erases data in the rewritable non-volatile memory module 406 according to the command of the host system 11.

The rewritable non-volatile memory module 406 is coupled to the memory controlling circuit unit 404 for storing the data written by the host system 11. The rewritable non-volatile memory module 406 has physical erasing units 510(0)~510(N). For example, the physical erasing units 510(0)~510(N) may belong to the same memory die or different memory dice. Each of the physical erasing units respectively have a plurality of physical programming units. For example, in the exemplary embodiment of the disclosure, each physical erasing unit has 258 physical programming units, wherein the physical programming units that belong to the same physical erasing unit may be independently written and erased simultaneously; however, it should be indicated that the disclosure is not limited thereto. Each of the physical erasing units may be constituted by 64 physical programming units, 256 physical programming units or any number of physical programming units.

More specifically, the physical erasing unit is the minimum unit for erasing operation. That is, each of the physical erasing units has the least number of memory cell that is erased altogether. The physical programming unit is the minimum unit for programming operation. In other words, the physical programming unit is the minimum unit for writing data. Generally, each of the physical programming unit includes a data bit area and a redundancy bit area. The data bit area includes a plurality of physical access addresses for storing user's data, and the redundancy bit area is used for storing data of system (e.g., control information and error correcting code). In the exemplary embodiment, the data bit area of each of the physical programming units includes 4 physical access addresses, and the size of each of the physical access addresses is 512 byte. However, in other exemplary embodiments, the data bit area may include a more number or a less number of physical access addresses; the disclosure provides no limitation to the size and the number of the physical access address.

In the exemplary embodiment of the disclosure, the rewritable non-volatile memory module 406 is a trinary level cell (TCL) NAND flash memory module (i.e., a flash memory cell module that can store 3 data bits in one memory cell). However, the present disclosure is not limited thereto. The rewritable non-volatile memory module 406 may be a Multi Level Cell (MLC) NAND flash memory module (i.e., a flash memory module that can store two data bits in one memory cell), other flash memory modules or other memory modules having the same characteristics.

Figure 5A:
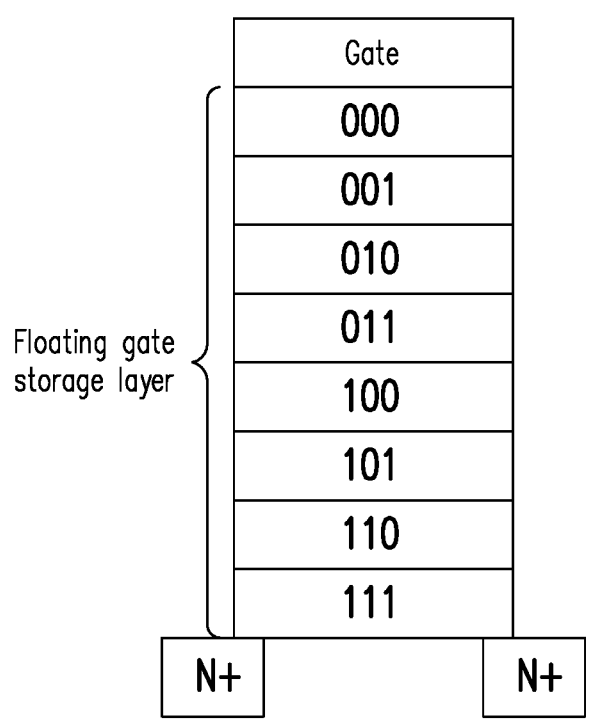

FIG. 5A and FIG. 5B are a schematic diagrams of a memory cell storage structure and a physical erasing unit according to an exemplary embodiment.

Referring to FIG. 5A, the storage status of each memory cell of the rewritable non-volatile memory module 406 may be identified as "111", "110", "101", "100", "011", "010", "001" or "000" (as shown in FIG. 5A), wherein the first bit counted from the left side is LSB, the second bit counted from the left side is CSB and the third bit counted from the left side is MSB. In addition, a plurality of memory cells arranged on the same word line may constitute three physical programming units, wherein the physical programming units constituted by LSB of the memory cells is called as a lower physical programming unit, the physical programming unit constituted by CSB of the memory cells is called a middle physical programming unit, and the physical programming unit constituted by MSB of the memory cells is called an upper physical programming unit.

Referring to FIG. 5B, one physical erasing unit is constituted by a plurality of the physical programming unit sets including the lower physical programming unit, the middle programming unit and the upper physical programming unit constituted by the plurality of memory cells arranged on the same word line. For example, in the physical erasing unit, the $0^{th}$ physical programming unit belonging to the lower physical programming unit, the $1^{st}$ physical programming unit belonging to the middle physical programming unit and the $2^{nd}$ physical programming unit belonging to the upper physical programming unit are regarded as one physical programming unit set. Similarly, the $3^{rd}$, the $4^{th}$ and the $5^{th}$ physical programming units are regarded as one physical programming unit set; likewise, other physical programming units are classified into a plurality of physical programming unit sets according to the same method.

Figure 6:
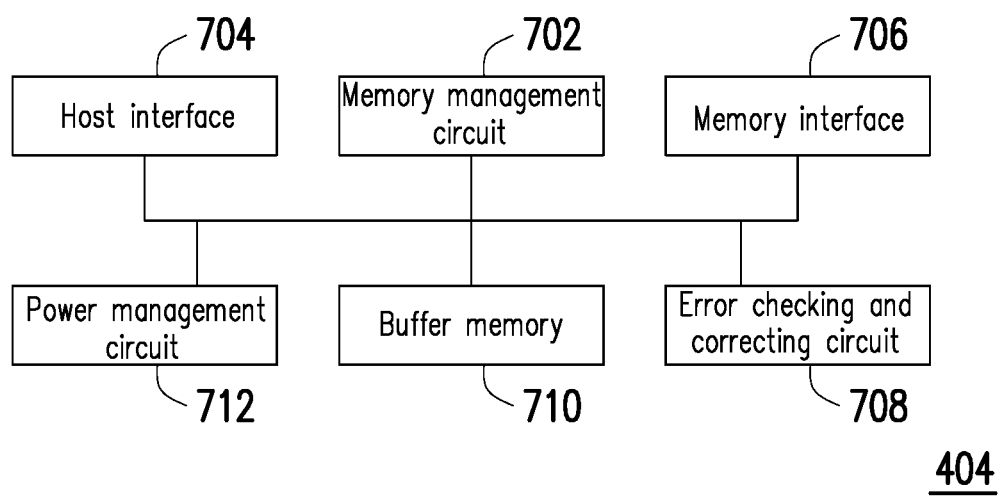
FIG. 6 is a schematic block diagram of a memory controlling circuit unit according to an exemplary embodiment of the disclosure.

FIG. 6 is a schematic block diagram of a memory controlling circuit unit according to an exemplary embodiment of the disclosure.

Referring to FIG. 6, the memory controlling circuit unit 404 includes a memory management circuit 702, a host interface 704 and a memory interface 706 and an error checking and correcting circuit 708.

The memory management circuit 702 controls the overall operation of the memory controlling circuit unit 404. Specifically, the memory management circuit 702 has a plurality of control commands, and when the memory storage device 10 is operated, the control commands are executed to perform writing, reading and erasing operations on data. Operations of the memory management circuit 702 or circuit element included in the memory control circuit unit 404 are similar to the operations of the memory controlling circuit unit 404, thus related description is omitted hereinafter.

In the exemplary embodiment, the control commands of the memory management circuit 702 are implemented in the form of firmware. For example, the memory management circuit 702 has a microprocessor unit (not shown) and a read only memory (not shown), and the control commands are recorded into the read only memory. When the memory storage device 10 is operated, the control commands are executed by the microprocessor unit to perform writing, reading and erasing operations on data.

In another exemplary embodiment, the control commands of the memory management circuit 702 may be stored in a specific area (e.g., a system area in the memory module that is exclusively used for storing system data) of the rewritable non-volatile memory module 406 in the form of program code. In addition, the memory management circuit 702 has a microprocessor unit (not shown), a read only memory (not shown) and a random access memory (not shown). In particular, the read only memory has a boot code, and when the memory controlling circuit unit 404 is enabled, the microprocessor unit executes the boot code first to load the control command stored in the rewritable non-volatile memory module 406 into the random access memory of the memory management circuit 702. Thereafter, the microprocessor unit runs the control commands to perform writing, reading and erasing operations on data.

In addition, in another exemplary embodiment of the invention, the control commands of the memory management circuit 702 may be implemented in the form of hardware. For example, the memory management circuit 702 includes a micro-controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro-controller. The memory cell management circuit manages the memory cell or groups of memory cells of the rewritable non-volatile memory module 406; the memory writing circuit gives a write command to the rewritable non-volatile memory module 406 to write the data into the rewritable non-volatile memory module 406; the memory reading circuit gives a read command to the rewritable non-volatile memory module 406 to read data from the rewritable non-volatile memory module 406; the memory erasing circuit gives an erase command to the rewritable non-volatile memory module 406 to erase the data from the rewritable non-volatile memory module 406; and the data processing circuit processes the data to be written into the rewritable non-volatile memory module 406 and reads data from the rewritable non-volatile memory module 406. The write command sequence, the read command sequence, and the erase command sequence may each include one or more program codes or command codes and are configured to instruct the rewritable non-volatile memory module 406 to perform corresponding operations such as writing, reading, and erasing. In an exemplary embodiment, the memory management circuit 702 may also give other types of command sequences to the rewritable non-volatile memory module 406 to instruct the rewritable non-volatile memory module 406 to perform corresponding operations.

The host interface 704 is coupled to the memory management circuit 702 and configured to receive and identify the command and data transmitted by the host system 11. In other words, the command and data transmitted by the host system 11 are transmitted to the memory management circuit 702 through the host interface 704. In the exemplary embodiment, the host interface 704 meets the SATA standard. However, it should be understood that the present disclosure provides no limitation thereto. The host interface 704 may also meet the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard or other suitable data transmitting standard.

The memory interface 706 is coupled to the memory management circuit 702 and accesses the rewritable non-volatile memory module 406. In other words, the data that is to be written into the rewritable non-volatile memory module 406 is converted by the memory interface 706 into a format that can be accepted by the rewritable non-volatile memory module 406. Specifically, if the memory management circuit 702 is to access the rewritable non-volatile memory module 406, the memory interface 706 transmits a corresponding command sequence. For example, the command sequences may include a write command sequence indicating to write data, a read command sequence indicating to read data, an erasing command sequence indicating to erase data and corresponding command sequences indicating various memory operations (for example, to change a reading voltage level or execute a garbage collection procedure, etc.). These command sequences are, for example, generated by the memory management circuit 702, and are transmitted to the rewritable non-volatile memory module 406 through the memory interface 706. These command sequences may include one or a plurality of signals, or data on the bus. The signals or data may include command codes or program codes. For example, the reading command sequence may include information of a read identification code, a memory address, etc.

The error checking and correcting circuit 708 is coupled to the memory management circuit 702 and is used for executing an error checking and correcting procedure to ensure correctness of data. To be specific, when the memory management circuit 702 receives a write command from the host system 11, the error checking and correcting circuit 708 generates an error correcting code (ECC) and/or an error detecting code (EDC) for the data corresponding to the write command, and the memory management circuit 702 writes the data corresponding to the write command and the corresponding ECC and/or the EDC to the rewritable non-volatile memory module 406. Then, when the memory management circuit 702 reads data from the rewritable non-volatile memory module 406, the ECC and/or the EDC corresponding to the data are simultaneously read, and the error checking and correcting circuit 708 performs the error checking and correcting procedure on the read data according to the ECC and/or the EDC.

In an exemplary embodiment, the memory controlling circuit unit 404 further includes a buffer memory 710 and a power management circuit 712.

The buffer memory 710 is coupled to the memory management circuit 702 and used to temporarily store data and command from the host system 11 or data from the rewritable non-volatile memory module 406. The power management circuit 712 is coupled to the memory management circuit 702 and is used to control the power of the memory storage device 10.

In the exemplary embodiment, the error checking and correcting circuit 708 may perform a single-frame encoding for the data stored in the same physical programming unit and may also perform a multi-frame encoding for data stored in the multiple physical programming units. Each of the single-frame encoding and the multi-frame encoding may adopt at least one of encoding algorithms including a low density parity code, a BCH code, a convolutional code or a turbo code. Alternatively, in an exemplary embodiment, the multi-frame encoding may further adopt a Reed-solomon code (RS code) algorithm or an XOR algorithm. Further, in another exemplary embodiment, other encoding algorithms not mentioned above may also be adopted, which are omitted herein. According to the adopted encoding algorithm, the error checking and correcting circuit 708 can encode the data to be protected, so as to generate the corresponding ECC and/or the EDC. For convenience of explanation, the ECC and/or the EDC generated through encoding will be collectively referred to as coded data hereinafter.

It is noted that in the following description, some terms may be replaced with corresponding abbreviations for ease of reading (see Table 1).

TABLE 1

| rewritable non-volatile memory module | RNVM module |
|---|---|
| physical erasing unit | PEU |
| physical programming unit | PPU |
| memory management circuit | MMC |
| logical-physical mapping table | L2P table |
| physical-logical mapping table | P2L table |

Figure 7:
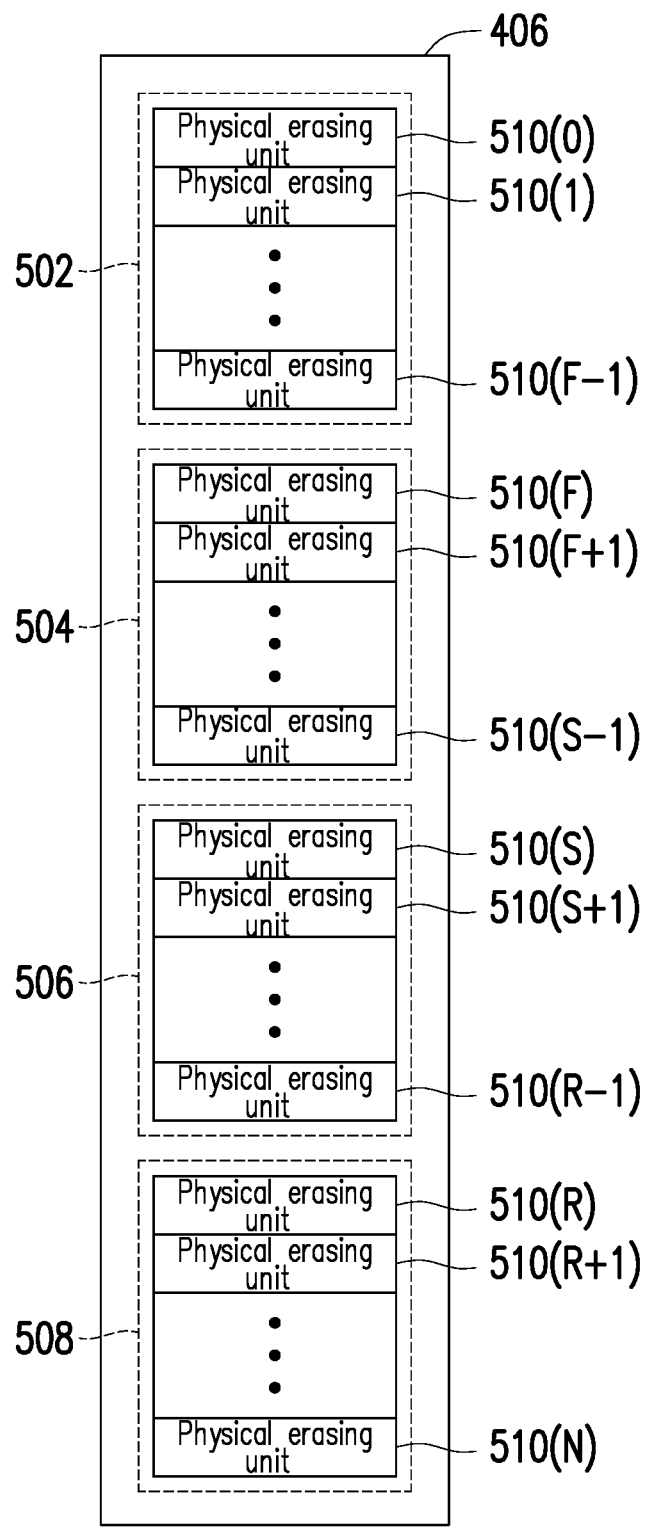
FIG. 7 and FIG. 8 are schematic diagrams showing an example of managing a physical erasing unit according to an exemplary embodiment of the disclosure.
Figure 8:
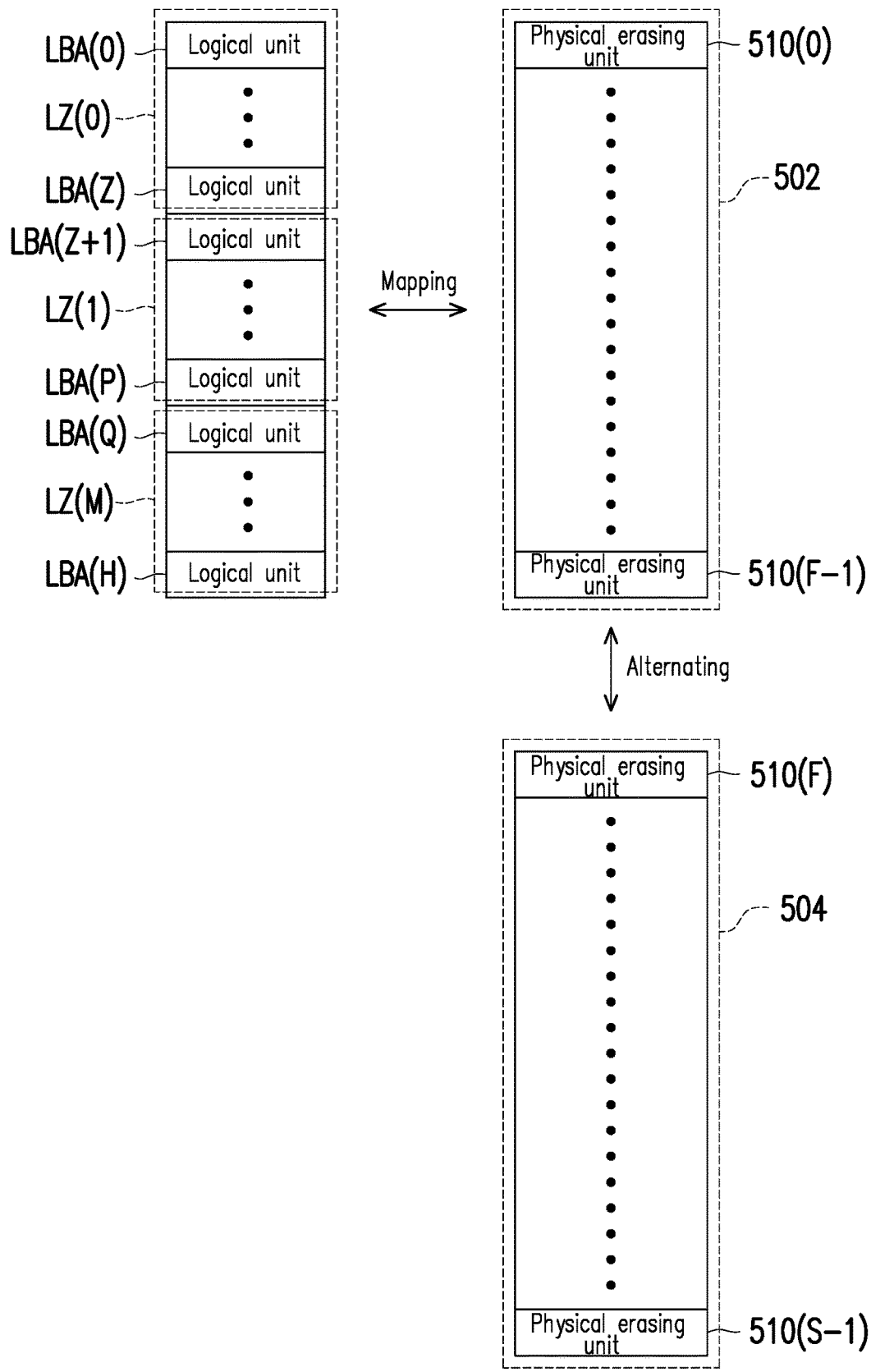

FIG. 7 and FIG. 8 are schematic diagrams showing an example of managing a PEU according to an exemplary embodiment.

Referring to FIG. 7, the RNVM module 406 has PEUs 510(0)-510(N), and the MMC 702 is logically partitioned into a data area 502, a free area 504, a temporary area 506, and a replacement area 508.

The PEU logically belonging to the data area 502 and the free area 504 is for storing data from the host system 11. Specifically, the PEU in the data area 502 is a PEU that is regarded as being stored with data, and the PEU in the free area 504 is for replacing the PEU in the data area 502. That is, when receiving the write command and the data to be written from the host system 11, the MMC 702 extracts the PEU from the free area 504, and writes the data to the extracted PEU to replace the PEU in the data area 502.

The PEU logically belonging to the temporary area 506 is used to record system data. For example, system data includes a L2P table, a manufacturer and model of the RNVM module, the number of PEUs of the RNVM module, and the number of PPUs of each PEU, and so on.

The PEU logically belonging to the replacement area 508 is used in a bad PEU replacement program to replace the damaged PEU. Specifically, if there is normal PEU remaining in the replacement area 508 and the PEU in the data area 502 is damaged, the MMC 702 extracts the normal PEU from the replacement area 508 to replace the damaged PEU.

Specifically, the number of PEUs in the data area 502, the free area 504, the temporary area 506, and the replacement area 508 may vary depending on different memory specifications. In addition, it should be understood that in the operation of the memory storage device 10, the grouping relationship in which the PEU is associated with the data area 502, the free area 504, the temporary area 506, and the replacement area 508 may change dynamically. For example, when the PEU in the free area 504 is damaged and replaced by the PEU in the replacement area 508, the PEU that is originally in the replacement area 508 is associated with the free area 504.

Referring to FIG. 8, the MMC 702 assigns the logical units LBA(0)~LBA(H) to map the PEUs in the data area 502, wherein each of the logical units has a plurality of logical sub-units to map the PPU of the corresponding PEU. Moreover, when the host system 11 is to write data to the logical unit or update the data stored in the logical unit, the MMC 702 extracts one PEU from the free area 504 to write data to replace the PEU in the data area 502. In this exemplary embodiment, the logical sub-unit may be logical pages or logical sectors.

In order to identify which PEU in which the data of each logical unit is stored, in the exemplary embodiment, the MMC 702 records the mapping between the logical unit and the PEU. Moreover, when the host system 11 is to access data in the logical sub-unit, the MMC 702 confirms the logical unit to which the logical sub-unit belongs, and accesses the data in the PEU mapped by the logical unit. For example, in the exemplary embodiment, the MMC 702 stores a L2P table in the RNVM module 406 to record the PEU mapped by each of the logical units, and when the data is to be accessed, the MMC 702 loads the L2P table into the buffer memory 710 for maintenance.

It should be indicated that since the capacity of the buffer memory 710 is limited, it is not possible to store the mapping table that records the mapping relationship of all logical units, in the present exemplary embodiment, the MMC 702 groups the logical units LBA(0)~LBA(H) into a plurality of logical regions LZ(0)~LZ(M), and assigns one L2P table for each of the logical regions. Specifically, when the MMC 702 is to update the mapping of a certain logical unit, the L2P table corresponding to the logical region to which the logical unit belongs is loaded into the buffer memory 710 to be updated. In the present exemplary embodiment, the space required to store all the L2P tables is 0.001 percentage of the corresponding space available for storing data in the RNVM module 406. That is to say, if the capacity of the RNVM module 406 is 1 TB (terabyte), the space required to store all the L2P tables is 1 GB (gigabyte). However, in other exemplary embodiments, the space required to store all of the L2P tables may vary depending on the capacity of the RNVM module 406.

In the present exemplary embodiment, when the host system 11 is to perform a write operation, the MMC 702 extracts one active PEU from the free area 504 and writes the data (also referred to as the updated data) included in the write command from the host system 11 into the active PEU.

Specifically, when the memory storage device 10 receives a write command from the host system 11, the data in the write command from the host system 11 may be written into an active PEU in the free area 504. Moreover, when the PEU is full, the MMC 702 extracts an empty PEU from the free area 504 again as another active PEU to continue writing the updated data corresponding to the write command from the host system 11.

Figure 9A:
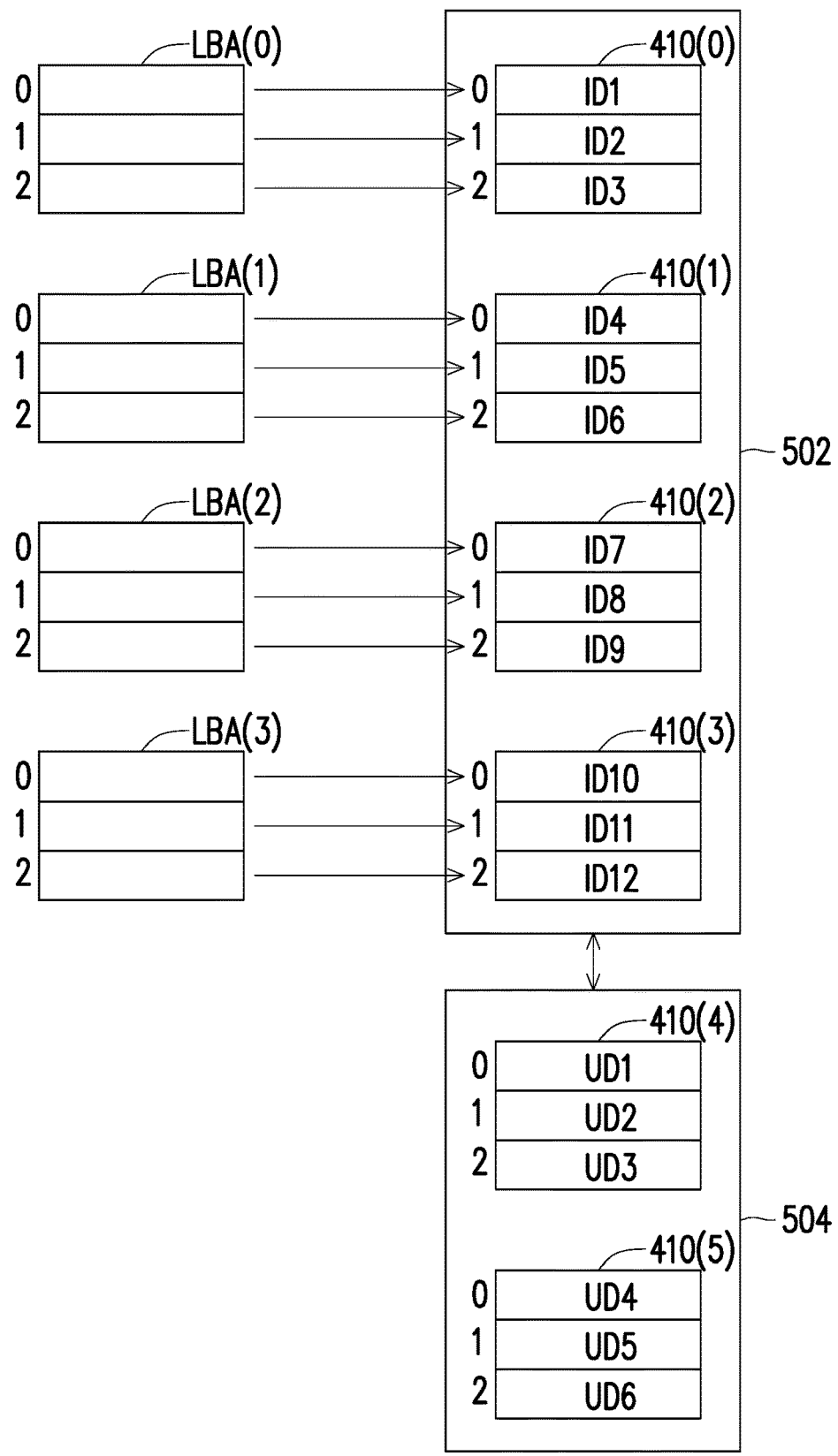

FIG. 9A-FIG. 9C are simplified examples of writing data according to an embodiment of the disclosure.

For convenience of explanation, it is assumed that the data area 502 has four PEUs, which are PEUs 410(0) to 410(3) respectively, and the free area 504 has two PEUs, which are PEUs 410(4)~410(5) respectively.

Referring to FIG. 9A, FIG. 9B and FIG. 9C, it is assumed that in the state of the memory storage device 10 of FIG. 9A, the logical pages of the logical units LBA(0) to LBA(3) map the PPUs of the PEUs 410(0)~410(3) in the data area 502, and the free area 504 has PEUs 410(4)-410(5). That is, the MMC 702 records the mapping relationship between the logical units LBA(0) to LBA(3) and the PEUs 410(0) to 410(5) in the L2P table, and regards the PPUs of the PEUs 410(0)-410(3) as being stored with data (i.e., initial data ID1-ID12) belonging to the logical page of the logical units LBA(0)~LBA(3). In addition, the MMC 702 records the usable PEUs 410(4)-410(5) in the free area 504, and when the host system 11 performs a write operation, the MMC 702 records the mapping information of the updated data corresponding to the write operation into the P2L table 600 as shown in FIG. 9B in the buffer memory 710.

Specifically, when the host system 11 performs a write operation related to a logical page, the MMC 702 writes the updated data corresponding to the write operation into the active PEU selected from the free area 504. Meanwhile, the MMC 702 does not change the mapping relationship between the logical units LBA(0) to LBA(3) and the PEUs 410(0) to 410(5) in the L2P table. The MMC 702 records an address (also referred to as physical address) for storing the PPU of the updated data in the active PEU into the P2L table 600 in FIG. 9B along with the address (also referred to as logical address) of the logical page corresponding to the write operation. After the P2L table 600 is full, the corresponding L2P table is loaded into the buffer memory 710 according to the mapping information (i.e., the logical address corresponding to the updated data) in the P2L table 600, thereby updating the mapping relationship between the logical units LBA(0) to LBA(3) and the PEUs 410(0) to 410(5). It should be mentioned that when the memory storage device 10 is in an idle state for a period of time (for example, 30 seconds without receiving any command from the host system 11), the MMC 702 may also load a corresponding L2P table into the buffer memory 710 according to the mapping information in the P2L table 600, thereby updating the mapping relationship between the logical units LBA(0)~LBA(3) and the PEUs 410(0)-410(5).

Moreover, in the present exemplary embodiment, the MMC 702 establishes an updated data count table 700 as shown in FIG. 9C. It should be noted that after performing a write operation to write the data of a logical page into the active PEU, the logical unit to which the logical page belongs may be referred to as an "updated logical unit". In other words, the logical unit to which the logical address belongs recorded in the P2L table 600 is the aforementioned "updated logical unit". The updated data count table 700 is used to record the number (also referred to as updated data count) of valid updated data corresponding to the write operation and currently possessed by each of the updated logical units in the active PEU. In other words, in terms of an updated data count of an updated logical unit, the updated data count may be used to represent how much mapping information in the updated logical unit needs to be updated. In the present exemplary embodiment, the logical unit having the non-zero updated data count in the updated data count table 700 may also be regarded as the aforementioned "updated logical unit". It should be noted that if multiple write operations are repeatedly performed to the same logical address, the valid updated data of the logical address in the active PEU is the updated data written during the last write operation.

Referring to FIG. 9A, FIG. 9B and FIG. 9C, assuming that the host system 11 is to write the updated data UD1 and the updated data UD1 is belonging to the first logical page of the logical unit LBA(0), the MMC 702 extracts, for example, the PEU 410 (4) from the free area 504 as an active PEU, and gives a write command to write the updated data UD1 into the 0th PPU of the PEU 410(4). Next, as shown in FIG. 9B, the MMC 702 records the mapping information between the 0th PPU (i.e., the information "410(4)-0") of the PEU 410(4) and the first logical page (i.e., the information "LBA(0)-1") of the logical unit LBA(0) in the P2L table 600. In addition, as shown in FIG. 9C, corresponding to the write operation, the MMC 702 also changes the updated data count corresponding to the logical unit LBA(0) in the updated data count table 700 into 1 to represent that one mapping information in the logical unit LBA (0) needs to be updated.

Thereafter, assuming that the host system 11 is to write the updated data UD2 and the updated data UD2 is belonging to the first logical page of the logical unit LBA(2), the MMC 702 writes the updated data UD2 into the first PPU of the PEU 410(4). Next, as shown in FIG. 9B, the MMC 702 records the mapping information between the first PPU (i.e., the information "410(4)-1") of the PEU 410(4) and the first logical page (i.e., the information "LBA(2)-1") of the logical unit LBA(2) in the P2L table 600. In addition, corresponding to the write operation, the MMC 702 also changes the updated data count corresponding to the logical unit LBA(2) in the updated data counter table 700 to 1 to represent that one mapping information in the logical unit LBA(2) needs to be updated.

Thereafter, assuming that the host system 11 is to write the updated data UD3 and the updated data UD3 is belonging to the second logical page of the logical unit LBA(2), the MMC 702 writes the updated data UD3 into the second PPU of the PEU 410(4). Next, as shown in FIG. 9B, the MMC 702 records the mapping information between the second PPU (i.e., the information "410(4)-2") of the PEU 410(4) and the second logical page (i.e., the information "LBA(2)-2") of the logical unit LBA(2) in the P2L table 600. In addition, corresponding to the write operation, the MMC 702 also changes the updated data count corresponding to the logical unit LBA(2) in the updated data counter table 700 to 2 to represent that two mapping information in the logical unit LBA(2) need to be updated, as shown in FIG. 9C.

Thereafter, assuming that the host system 11 is to write the updated data UD4 and the updated data UD4 is belonging to the first logical page of the logical unit LBA(3), the MMC 702 extracts the PEU 410(5) from the free area 504. The MMC 702 writes the updated data UD4 into the 0th PPU of the PEU 410(5). Next, as shown in FIG. 9B, the MMC 702 records the mapping information between the 0th PPU (i.e., the information "410(5)-0") of the PEU 410(5) and the first logical page (i.e., the information "LBA(3)-1") of the logical unit LBA(3) in the P2L table 600. In addition, corresponding to the write operation, the MMC 702 also changes the updated data count corresponding to the logical unit LBA(3) in the updated data counter table 700 to 1 to represent that one mapping information in the logical unit LBA(3) need to be updated.

Thereafter, assuming that the host system 11 is to write the updated data UD5 and the updated data UD5 is belonging to the second logical page of the logical unit LBA(3), the MMC 702 writes the updated data UD5 into the first PPU of the PEU 410(5). Next, as shown in FIG. 9B, the MMC 702 records the mapping information between the first PPU (i.e., the information "410(5)-1") of the PEU 410(5) and the second logical page (i.e., the information "LBA(3)-2") of the logical unit LBA(3) in the P2L table 600. In addition, corresponding to the write operation, the MMC 702 also changes the updated data count corresponding to the logical unit LBA(3) in the updated data counter table 700 to 2 to represent that two mapping information in the logical unit LBA(3) need to be updated, as shown in FIG. 9C.

Thereafter, assuming that the host system 11 is to write the updated data UD6 and the updated data UD6 is belonging to the first logical page of the logical unit LBA(1), the MMC 702 writes the updated data UD6 into the second PPU of the PEU 410(5). Next, as shown in FIG. 9B, the MMC 702 records the mapping information between the second PPU (i.e., the information "410(5)-2") of the PEU 410(5) and the first logical page (i.e., the information "LBA(1)-1") of the logical unit LBA(1) in the P2L table 600. In addition, corresponding to the write operation, the MMC 702 also changes the updated data count corresponding to the logical unit LBA(1) in the updated data counter table 700 to 1 to represent that two mapping information in the logical unit LBA(1) needs to be updated, as shown in FIG. 9C.

After the aforementioned write operations, as the updated data count table 700 shown in FIG. 9C, the updated data count of the logical unit LBA(0) is 1. The updated data count of the logical unit LBA(1) is 1, the updated data count of the logical unit LBA(2) is 2, and the updated data count of the logical unit LBA(3) is 2. In other words, after the aforementioned write operations, the mapping information of one logical address in the logical unit LBA(0) has to be updated, the mapping information of one logical address in the logical unit LBA(1) has to be updated, the mapping information of the two logical addresses in the logical unit LBA(2) has to be updated and the mapping information of the two logical addresses in the logical unit LBA(3) has to be updated.

It should be understood that, since the P2L table 600 is full at this time, the MMC 702 loads the corresponding L2P table into the buffer memory 710 according to the logical address corresponding to the information written into the P2L table 600, thereby updating the mapping relationship between the logical units LBA(0) to LBA(3) and the PEUs 410(0)-410(5).

The mapping table updating method of the present disclosure is described below in various embodiments.

First Embodiment

Figure 10A:
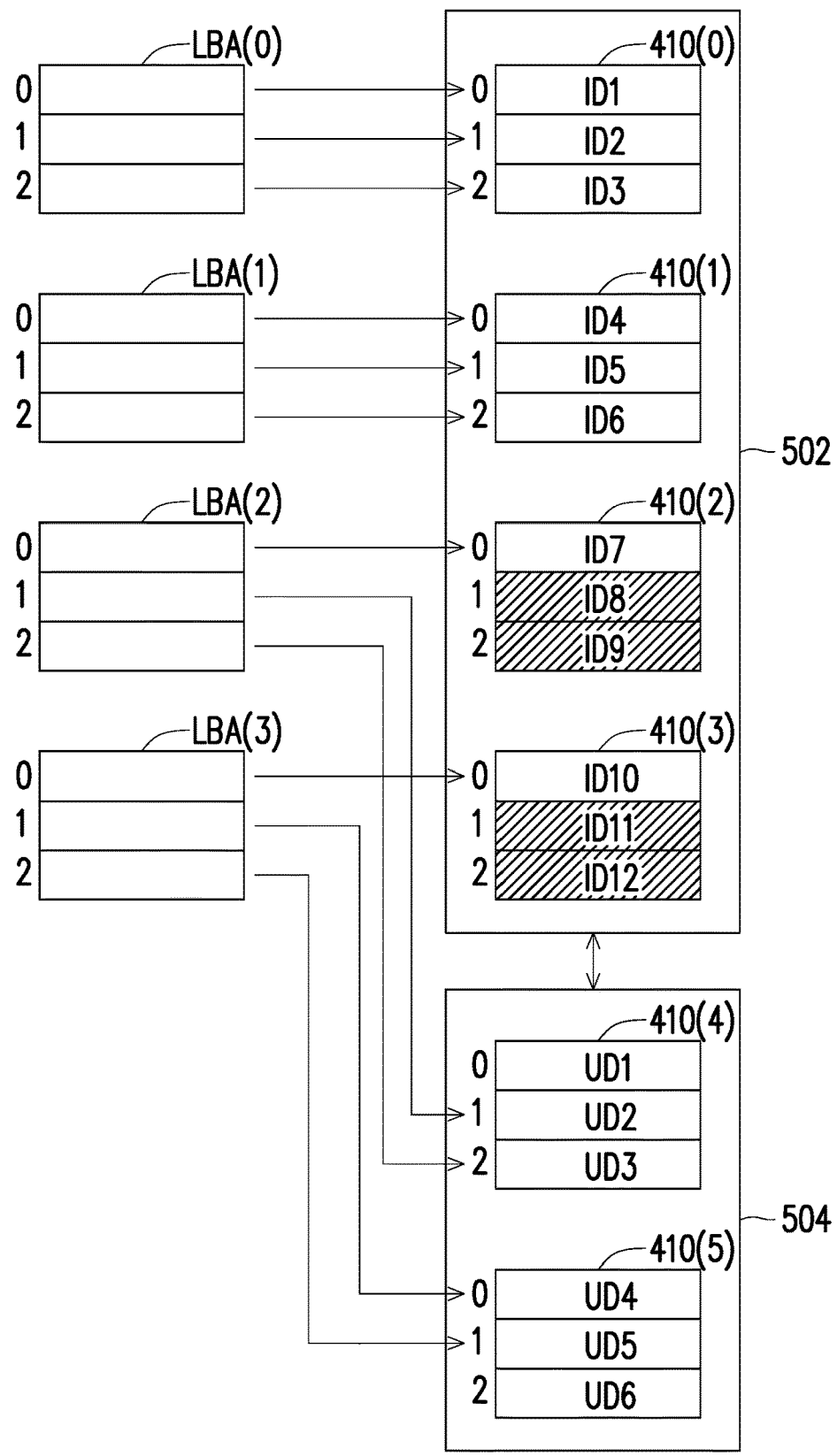

FIG. 10A-FIG. 10C are simplified examples of updating mapping table according to a first embodiment of the present disclosure.

Referring to FIG. 10A, FIG. 10B and FIG. 10C, following FIG. 9A, FIG. 9B and FIG. 9C, the MMC 702 first selects the L2P table that needs to be loaded to update the mapping information according to the updated data count table 700 of FIG. 9C. In the first embodiment of the present disclosure, the MMC 702 may, for example, set a threshold (also referred to as a first threshold) in advance. When the updated data count corresponding to a logical unit is greater than the first threshold, the MMC 702 loads the L2P table of the logical unit into the buffer memory 710, and updates the L2P table of the logical unit according to the information in the P2L table 600. It should be noted that the present disclosure provides no limitation to the exact value of the first threshold.

In more detail, in the embodiments of FIG. 10A, FIG. 10B, and FIG. 10C, it is assumed that the first threshold is 1. The MMC 702 selects the logical unit LBA(2) and the logical unit LBA(3) of which the updated data counts are larger than the first threshold. The MMC 702 loads the L2P table (also referred to as a first L2P table) corresponding to the logical unit LBA(2) and the logical unit LBA(3) (collectively referred to as the first updated logical unit) from the RNVM module 406 according to the P2L table 600. In detail, since the updated information (i.e., the information "LBA(2)-1" and "LBA(2)-2") of the 1st-2nd logical pages of the logical unit LBA(2) as well as the updated information (i.e., information "LBA(3)-1" and "LBA(3)-2") of the 1st-2nd logical pages of the logical unit LBA(3) are stored in the P2L table 600 of FIG. 9B, the MMC 702 correspondingly loads the L2P table of the logical unit LBA(2) and the L2P table of the logical unit LBA(3) from the RNVM module 406 into the buffer memory 710. In this example, the number (i.e., 2) of first updated logical units is less than the number (i.e., 4) of the logical units (also referred to as updated logical units) of which the updated data count in the updated data count table 700 is non-zero.

Next, the MMC 702 updates the mapping relationship between the logical unit LBA(2) and the logical unit LBA(3) and the PEU 410(0)-410(5) according to the information stored in the P2L table 600 in FIG. 9B. Specifically, since the P2L table 600 stores the update information regarding that the updated data UD2 of the first logical page (i.e., the information "LBA(2)-1") of the logical unit LBA(2) is stored in the first PPU (i.e., information "410(4)-1") of the PEU 410(4), the update information regarding that the updated data UD3 of the second logical page (i.e., the information "LBA(2)-2") of the logical unit LBA(2) is stored in the second PPU (i.e., information "410(4)-2") of the PEU 410(4), the update information regarding that the updated data UD4 of the first logical page (i.e., the information "LBA(3)-1") of the logical unit LBA(3) is stored in the 0th PPU (i.e., information "410(5)-0") of the PEU 410(5) and the update information regarding that the updated data UD5 of the second logical page (i.e., the information "LBA(3)-2") of the logical unit LBA(3) is stored in the first PPU (i.e., information "410(5)-1") of the PEU 410(5), the MMC 702 updates the L2P table of the logical unit LBA(2) and the L2P table of the logical unit LBA(3) respectively, thereby mapping the first logical page of the logical unit LBA(2) to the first PPU of the PEU 410(4), mapping the second logical page of the logical unit LBA(2) to the second PPU of the PEU 410 (4), mapping the first logical page of the logical unit LBA (3) to the 0th PPU of the PEU 410(5) and mapping the second logical page of the logical unit LBA(3) to the first PPU of the PEU 410(5), as shown in FIG. 10A.

After the updating of the foregoing mapping information is performed, the initial data ID8-ID9 in the 1-2nd PPU of the PEU 410(2) that is originally mapped by the 1-2nd logical page of the logical unit LBA(2) is identified as invalid data, and the initial data ID11-ID12 in the 1-2nd PPU of the PEU 410(3) that is originally mapped by the 1-2nd logical page of the logical unit LBA(3) is identified as invalid data.

Next, the MMC 702 stores the updated L2P table of the logical unit LBA(2) and the logical unit LBA(3) back to the RNVM module 406. It should be noted that the present exemplary embodiment is not intended to limit the timing of storing the first L2P table back into the RNVM module 406.

In addition, the MMC 702 also modifies the P2L table 600 in FIG. 9B to the P2L table 600 in FIG. 10B. In more detail, the MMC 702 also clears the update information regarding that the updated data UD2 of the first logical page (i.e., the information "LBA(2)-1") of the logical unit LBA(2) is stored in the first PPU (i.e., information "410(4)-1") of the PEU 410(4), the update information regarding that the updated data UD3 of the second logical page (i.e., the information "LBA(2)-2") of the logical unit LBA(2) is stored in the second PPU (i.e., information "410(4)-2") of the PEU 410(4), the update information regarding that the updated data UD4 of the first logical page (i.e., the information "LBA(3)-1") of the logical unit LBA(3) is stored in the 0th PPU (i.e., information "410(5)-0") of the PEU 410(5) and the update information regarding that the updated data UD5 of the second logical page (i.e., the information "LBA (3)-2") of the logical unit LBA(3) is stored in the first PPU (i.e., information "410(5)-1") of the PEU 410(5) in the P2L table 600. Specifically, in the present embodiment, the MMC 702 also retains the update information regarding that the updated data UD1 of the first logical page (i.e., information "LBA(0)-1") of the logical unit LBA(0) is stored in the $0^{th}$ PPU (i.e., information "410(4)-0") of the PEU 410(4) and the update information regarding that the updated data UD6 of the first logical page (i.e., information "LBA(1)-1") of the logical unit LBA(1) is stored in the second PPU (i.e., information "410(5)-2") of the PEU 410(5) in the P2L table 600.

In addition, the MMC 702 also modifies the updated data count table 700 in FIG. 9C to the updated data count table 700 in FIG. 10C. In more detail, since the logical unit LBA(2) and the logical unit LBA(3) have no mapping information to be updated, the updated data counts of the logical unit LBA(2) and the logical unit LBA(3) are set to zero.

It should be noted that, in the foregoing example, the MMC 702 selects the logical unit LBA(2) and the logical unit LBA(3) whose updated data count is greater than the first threshold and loads the L2P table corresponding to the logical unit LBA(2) and the logical unit LBA(3) for updating the mapping information. In other words, according to the foregoing first threshold, it can be ensured that the updated number of mapping information in the loaded L2P table can reach a certain value, thereby improving the efficiency of updating the L2P table. For the logical unit LBA(0) and the logical unit LBA(1) whose updated data counts are not greater than the first threshold, the MMC 702 may continue to perform subsequent write operations and wait until the updated data counts of the logical unit LBA(0) and the logical unit LBA(1) are greater than the first threshold, then the L2P table corresponding to the logical unit LBA(0) and the logical unit LBA(1) is loaded to update the mapping information. In this manner, when the number of mapping information to be updated in a L2P table is small, it can be avoided that most of the time in the flush operation is spent on loading and storing the L2P table and causing the problem that the efficiency of updating mapping table is low.

Second Embodiment

Figure 11A:
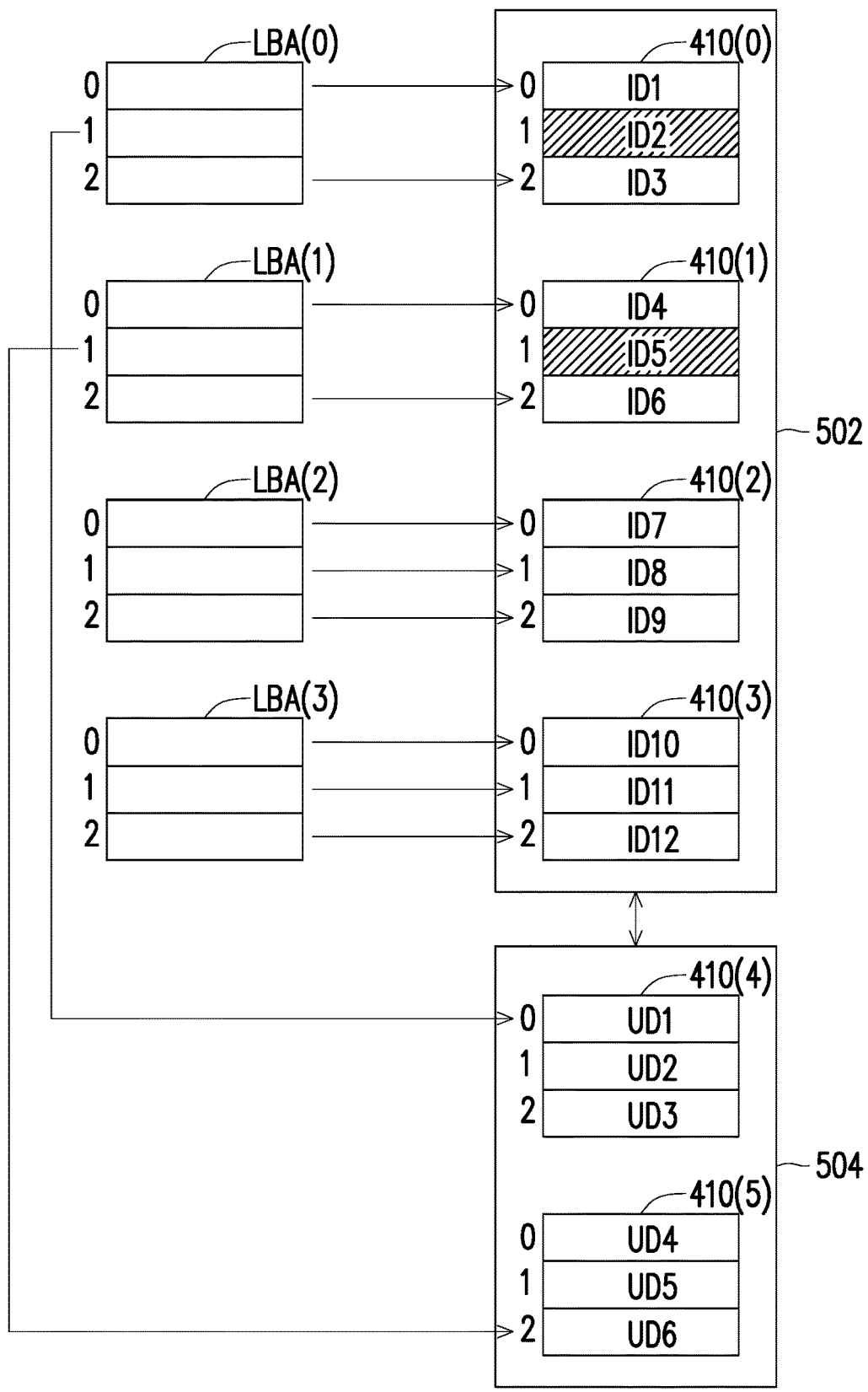

FIG. 11A-FIG. 11C are simplified examples of updating mapping table according to a second embodiment of the present disclosure.

Referring to FIG. 11A, FIG. 11B and FIG. 11C, following FIG. 9A, FIG. 9B and FIG. 9C, the MMC 702 first selects the L2P table that is required to be loaded and perform updating of mapping information according to the updated data count table 700 in FIG. 9C. In the second embodiment of the present disclosure, the MMC 702 may, for example, set a threshold (also referred to as a second threshold) in advance. When the updated data count corresponding to a logical unit is less than the second threshold, the MMC 702 loads the L2P table of the logical unit into the buffer memory 710, and updates the L2P table of the logical unit according to the information in the P2L table 600. It should be noted that the present disclosure provides no limitation to the exact value of the second threshold.

In more detail, in the embodiment of FIG. 11A, FIG. 11B, and FIG. 11C, it is assumed that the second threshold is 2. The MMC 702 selects the logical unit LBA(0) and the logical unit LBA(1) whose updated data counts are less than the aforementioned second threshold. The MMC 702 loads the L2P table (also referred to as a first L2P table) corresponding to the logical unit LBA(0) and the logical unit LBA(1) (collectively referred to as the first updated logical unit) from the RNVM module 406 according to the P2L table 600. Specifically, since the P2L table 600 in FIG. 9B stores the update information (i.e., information "LBA(0)-1") regarding the first logical page of the logical unit LBA(0) and the update information (i.e., information "LBA(1)-1") regarding the first logical page of the logical unit LBA(1), the MMC 702 correspondingly loads, from the RNVM module 406, the L2P table of the logical unit LBA(0) and the L2P table of the logical unit LBA(1) into the buffer memory 710. In this example, the number (i.e., 2) of first updated logical units is less than the number (i.e., 4) of the logical units (also referred to as updated logical units) whose the updated data count in the updated data count table 700 is non-zero.

Next, the MMC 702 updates the mapping relationship between the logical unit LBA(0) and the logical unit LBA(1) and the PEU 410(0)-410(5) according to the information stored in the P2L table 600 in FIG. 9B. Specifically, since the P2L table 600 stores the update information regarding that the updated data UD1 of the first logical page (i.e., the information "LBA(0)-1") of the logical unit LBA(0) is stored in the 0th PPU (i.e., information "410(4)-0") of the PEU 410(4) and the update information regarding that the updated data UD6 of the first logical page (i.e., the information "LBA(1)-1") of the logical unit LBA(1) is stored in the second PPU (i.e., information "410(5)-2") of the PEU 410(5), the MMC 702 respectively updates the L2P table of the logical unit LBA(0) and the L2P table of the logical unit LBA(1), thereby mapping the first logical page of the logical unit LBA(0) to the 0th PPU of the PEU 410(4) and mapping the first logical page of the logical unit LBA(1) to the second PPU of the PEU 410(5), as shown in FIG. 11A.

After the updating of the foregoing mapping information is performed, the initial data ID2 in the first PPU of the PEU 410(0) that is originally mapped by the first logical page of the logical unit LBA(0) is identified as invalid data, and the initial data IDS in the first PPU of the PEU 410(1) that is originally mapped by the first logical page of the logical unit LBA(1) is identified as invalid data.

Next, the MMC 702 stores the updated L2P table of the logical unit LBA(0) and the logical unit LBA(1) back to the RNVM module 406. It should be noted that the present exemplary embodiment is not intended to limit the timing of storing the first L2P table back into the RNVM module 406.

In addition, the MMC 702 also modifies the P2L table 600 in FIG. 9B to the P2L table 600 in FIG. 11B. In more detail, the MMC 702 also clears the update information regarding that the updated data UD1 of the first logical page (i.e., the information "LBA(0)-1") of the logical unit LBA(0) is stored in the 0th PPU (i.e., information "410(4)-0") of the PEU 410(4) and the update information regarding that the updated data UD6 of the first logical page (i.e., the information "LBA(1)-1") of the logical unit LBA(1) is stored in the second PPU (i.e., information "410(5)-2") of the PEU 410(5) in the P2L table 600. Specifically, in the present embodiment, the MMC 702 also retains the update information regarding that the updated data UD2 of the first logical page (i.e., information "LBA(2)-1") of the logical unit LBA(2) is stored in the first PPU (i.e., information "410(4)-1") of the PEU 410(4), the update information regarding that the updated data UD3 of the second logical page (i.e., the information "LBA(2)-2") of the logical unit LBA(2) is stored in the second PPU (i.e., information "410(4)-2") of the PEU 410(4), the update information regarding that the updated data UD4 of the first logical page (i.e., the information "LBA(3)-1") of the logical unit LBA (3) is stored in the 0th PPU (i.e., information "410(5)-0") of the PEU 410(5) and the update information regarding that the updated data UD5 of the second logical page (i.e., the information "LBA(3)-2") of the logical unit LBA(3) is stored in the first PPU (i.e., information "410(5)-1") of the PEU 410(5) in the P2L table 600.

In addition, the MMC 702 also modifies the updated data count table 700 in FIG. 9C to the updated data count table 700 in FIG. 11C. In more detail, since the logical unit LBA(0) and the logical unit LBA(1) have no mapping information to be updated, the updated data counts of the logical unit LBA(0) and the logical unit LBA(1) are set to zero.

It should be noted that, in the foregoing example, the MMC 702 selects the logical unit LBA(0) and the logical unit LBA(1) whose updated data counts are less than the second threshold and loads the L2P table corresponding to the logical unit LBA(0) and the logical unit LBA(1) for updating the mapping information. In other words, if the updated data count of a logical unit is not less than the second threshold, it represents that there is a higher probability that the subsequent write operation continues writing data of the logical unit whose updated data count is not less than the second threshold. After loading the L2P table of the logical unit whose updated data count is less than the second threshold to update the mapping information, the mapping information of the logical unit whose updated data count is less than the second threshold in the P2L table may be cleared. In this manner, more space may be freed up to store the mapping information of the logical units whose updated data counts are not less than the second threshold.

In addition, it should be noted that, in the above-described first embodiment, the write operation to be performed by the host system is to write data to one or more random logical units; in the above second embodiment, the write operation to be performed by the host system is to write data to one or more logical units whose logical addresses are within a fixed range.

Third Embodiment

In the third embodiment of the present disclosure, the MMC 702 may set, for example, a threshold (also referred to as a third threshold) in advance. In more detail, the MMC 702 performs sorting according to the plurality of updated data counts in the updated data count table, and determines the third threshold according to the sorted updated data counts such that the number of the updated data count (also referred to as second updated data count) that is greater than the third threshold among the plurality of plurality of updated data counts is equal to the number of the updated data count (also referred to as the third updated data count) that is not greater than the third threshold among the plurality of updated data counts. In other words, the third threshold may be used to divide the logical units recorded in the updated data count table into two groups of the same quantity, one group is the logical units whose updated data counts are greater than the third threshold, and the other group is the logical units whose updated data counts are not greater than the third threshold.

In more detail, following the examples of FIG. 9A, FIG. 9B, and FIG. 9C, the MMC 702 performs sorting according to the plurality of updated data counts in the updated data count table 700 in FIG. 9C, and determines the third threshold (e.g., 1) according to the sorted updated data counts such that the number (i.e., 2) of the updated data count that is greater than the third threshold in the updated data count table 700 is equal to the number (i.e., 2) of the updated data count that is not greater than the third threshold in the updated data count table 700. With the third threshold, the MMC 702 may divide the logical units LBA(0)~LBA(3) in FIG. 9C into two groups of the same quantity, wherein one group is the logical unit LBA(2) and the logical unit LBA(3) whose updated data counts are greater than the third threshold, and the other group is the logical unit LBA(0) and the logical unit LBA(1) whose updated data counts are not greater than the third threshold.

Thereafter, the MMC 702 may identify the logical unit LBA(2) and the logical unit LBA(3) (collectively referred to as the second updated logical unit) as the first updated logical unit as described in the first embodiment, and perform the mapping table updating method as described in the first embodiment. However, in another embodiment, the MMC 702 may identify the logical unit LBA(0) and the logical unit LBA(1) (collectively referred to as the third updated logical unit) as the first updated logical unit described in the second embodiment, and perform the mapping table updating method as described in the second embodiment. The manner through which the mapping table is updated has been described in detail in the first embodiment and the second embodiment, and therefore related details are omitted herein.

It should be noted that, in the foregoing example, the MMC 702 divides the logical units recorded in the updated data count table into two groups of the same quantity according to the third threshold, and one group is the logical units whose updated data counts are greater than the third threshold, and the other group is the logical units whose updated data counts are not greater than the third threshold. Thereafter, the MMC 702 may select the logical units in one of the groups and loads the L2P table of this group of logical units for updating. In other words, when the updated data counts of the respective logical units in the updated data count table 700 are relatively close or in average, the mapping table updating method of the third embodiment may be directly executed to clear half of the mapping information recorded in the P2L table, and half of the space in the P2L table can be freed up.

It should be noted that, in the foregoing example, the third threshold may be used to divide the logical units recorded in the updated data count table into two groups of the same quantity, and one group is the logical units whose updated data counts are greater than the third threshold, and the other group is the logical units whose updated data counts are not greater than the third threshold, but the disclosure is not limited thereto. For example, in another embodiment, the MMC 702 may divide the logical units recorded in the updated data count table into two groups of different quantities according to the third threshold, and one group is the logical units whose the updated data counts are greater than the third threshold, and the other group is the logical units whose updated data counts are not greater than the third threshold. The proportional relationship between the total number of the logical units greater than the third threshold and the total number of logical units whose updated data counts are not greater than the third threshold may be approximated or equivalent to a predetermined ratio. In other words, the MMC 702 may select a plurality of logical units of one of the groups to directly execute the mapping table updating method of the third embodiment to clear the plurality of logical units corresponding to one of the selected groups recorded in the P2L table to free up a part of the space in the P2L table.

Figure 12:
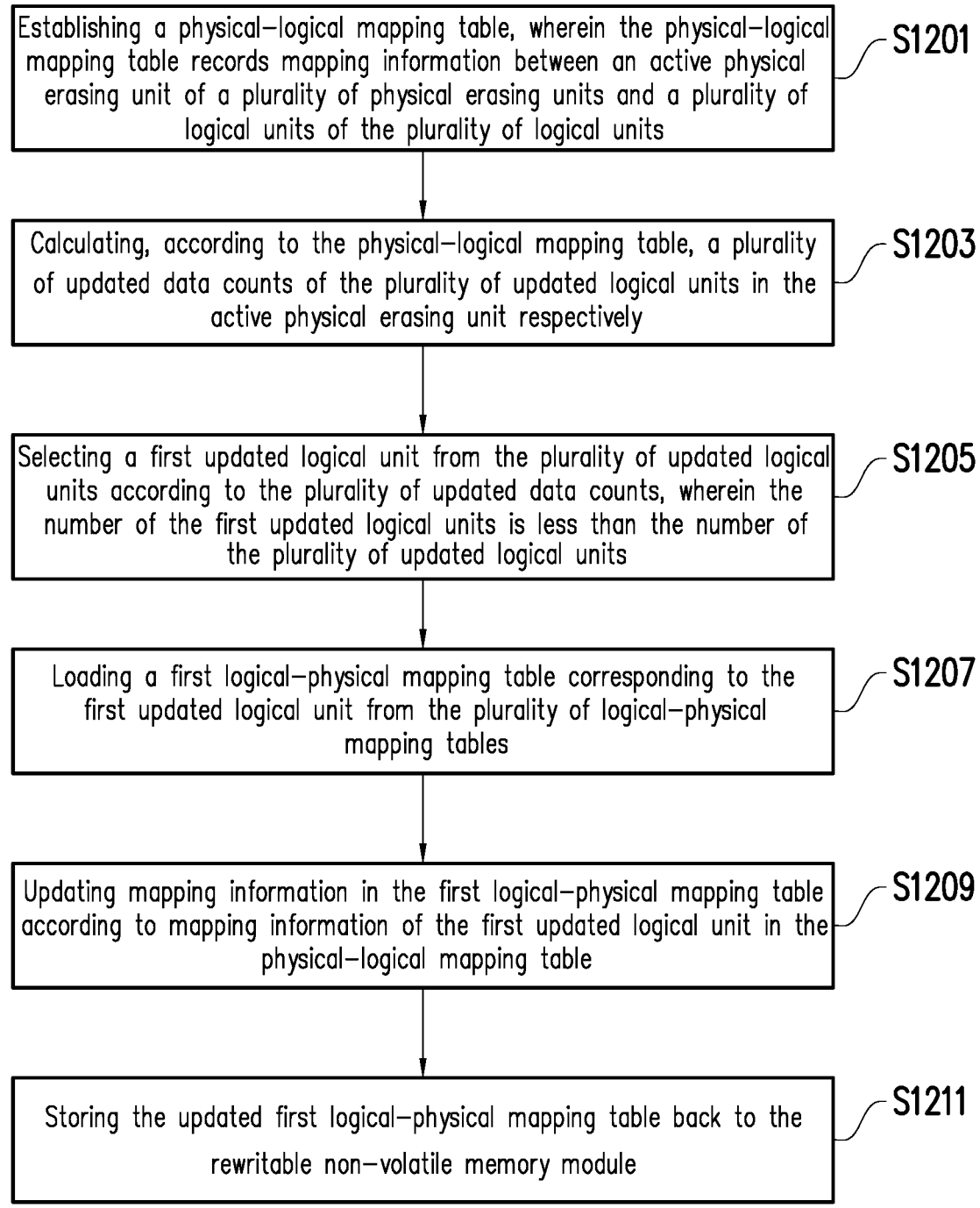
FIG. 12 is a flowchart of a mapping table updating method according to an embodiment of the disclosure.

FIG. 12 is a flowchart of a mapping table updating method according to an embodiment of the disclosure.

Referring to FIG. 12, in step S1201, the MMC 702 establishes the P2L table 600. The P2L table 600 records the mapping information between the active PEU among the plurality of PEUs and the plurality of updated logical units among the plurality of logical units. In step S1203, the MMC 702 calculates a plurality of updated data counts of the plurality of updated logical units in the active PEU respectively according to the P2L table 600. In step S1205, the MMC 702 selects the first updated logical unit from the plurality of updated logical units according to the aforementioned updated data count, wherein the number of first updated logical units is less than the number of the plurality of updated logical units. Next, in step S1207, the MMC 702 loads the first L2P table corresponding to the first updated logical unit from the plurality of L2P tables. In step S1209, the MMC 702 updates the mapping information in the first L2P table according to the mapping information of the first updated logical unit in the P2L table 600. Finally, in step S1211, the MMC 702 stores the updated first L2P table back to the RNVM module.

Figure 13:
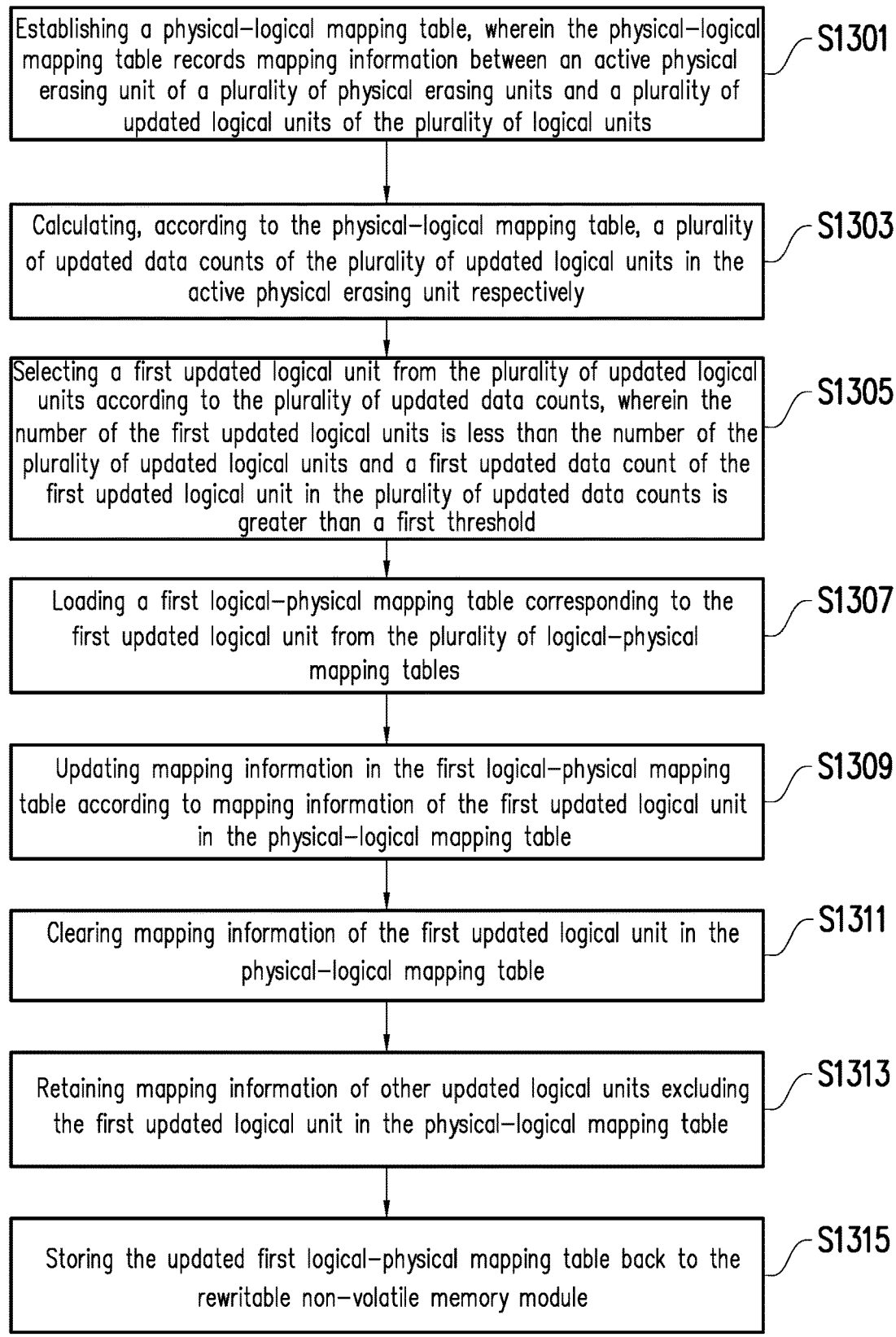
FIG. 13 is a flowchart of a mapping table updating method according to another embodiment of the disclosure.

FIG. 13 is a flowchart of a mapping table updating method according to another embodiment of the present disclosure.

Referring to FIG. 13, in step S1301, the MMC 702 establishes the P2L table 600. The P2L table 600 records the mapping information between the active PEU among the plurality of PEUs and the plurality of updated logical units among the plurality of logical units. In step S1303, the MMC 702 calculates a plurality of updated data counts of the plurality of updated logical units in the active PEU respectively according to the P2L table 600. In step S1305, the MMC 702 selects the first updated logical unit from the plurality of updated logical units according to the aforementioned updated data count, wherein the number of the first updated logical units is less than the number of the plurality of updated logical units and the first updated data count of the first updated logical units in the plurality of updated data counts is greater than the first threshold. Next, in step S1307, the MMC 702 loads the first L2P table corresponding to the first updated logical unit from the plurality of L2P tables. In step S1309, the MMC 702 updates the mapping information in the first L2P table according to the mapping information of the first updated logical unit in the P2L table 600. In step S1311, the MMC 702 clears the mapping information of the first updated logical unit in the P2L table 600. In step S1313, the MMC 702 retains the mapping information of other updated logical units excluding the first updated logical unit in the P2L table 600. Finally, in step S1315, the MMC 702 stores the updated first L2P table back to the RNVM module.

In summary, the mapping table updating method, the memory controlling circuit unit and the memory storage device of the present disclosure can load the corresponding L2P table to perform updating of mapping information according to only a part of the mapping information in the P2L table, and retain the remaining mapping information in the P2L table. In this manner, the efficiency of updating the L2P table can be improved.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A mapping table updating method for a rewritable non-volatile memory module, wherein the rewritable non-volatile memory module has a plurality of physical erasing units, a plurality of logical-physical mapping tables are stored in the rewritable non-volatile memory module to record mapping information between a plurality of logical units and the plurality of physical erasing units, and the mapping table updating method comprising:
   establishing a physical-logical mapping table, wherein the physical-logical mapping table records mapping information between at least one active physical erasing unit of the plurality of physical erasing units and a plurality of updated logical units of the plurality of logical units;
   calculating, according to the physical-logical mapping table, a plurality of updated data counts of the updated logical units in the active physical erasing unit respectively;
   selecting first updated logical units from the updated logical units according to the updated data counts, wherein a number of the first updated logical units is less than a number of the updated logical units;
   loading a first logical-physical mapping table corresponding to the first updated logical units from the plurality of logical-physical mapping tables; and
   updating mapping information in the first logical-physical mapping table according to mapping information of the first updated logical units in the physical-logical mapping table.

2. The mapping table updating method according to claim 1, further comprising:
   clearing the mapping information of the first updated logical unit in the physical-logical mapping table;
   retaining mapping information of other updated logical units excluding the first updated logical units in the physical-logical mapping table; and
   storing the updated first logical-physical mapping table back to the rewritable non-volatile memory module.

3. The mapping table updating method according to claim 1, wherein a first updated data count of the first updated logical units in the updated data counts is greater than a first threshold.

4. The mapping table updating method according to claim 1, wherein a first updated data count of the first updated logical units in the updated data counts is less than a second threshold.

5. The mapping table updating method according to claim 1, wherein steps of selecting the first updated logical units from the updated logical units comprises:
   sorting the updated data counts;
   determining a third threshold according to the updated data counts; and
   dividing, according to the third threshold, the updated data counts into at least one second updated data count and at least one third updated data count,
   wherein the second updated data count is greater than the third threshold and the third updated data count is not greater than the third threshold.

6. The mapping table updating method according to claim 5, wherein step of selecting the first updated logical units from the updated logical units further comprises:
   identifying at least one second updated logical unit of the updated logical units corresponding to the second updated data count as the first updated logical units, or identifying at least one third updated logical unit of the updated logical units corresponding to the third updated data count as the first updated logical units.

7. A memory controlling circuit unit, for controlling a rewritable non-volatile memory module, the memory controlling circuit unit comprising:
   a host interface, coupled to a host system;
   a memory interface, coupled to the rewritable non-volatile memory module, wherein the rewritable non-volatile memory module has a plurality of physical erasing units, a plurality of logical-physical mapping tables are stored in the rewritable non-volatile memory module to record mapping information between a plurality of logical units and the plurality of physical erasing units;
   a memory management circuit, coupled to the host interface and the memory interface,
   wherein the memory management circuit is configured to establish a physical-logical mapping table, wherein the physical-logical mapping table records mapping information between at least one active physical erasing unit of the plurality of physical erasing units and a plurality of updated logical units of the plurality of logical units,
   wherein the memory management circuit is further configured to calculate, according to the physical-logical mapping table, a plurality of updated data counts of the updated logical units in the active physical erasing unit,
   wherein the memory management circuit is further configured to select first updated logical units from the updated logical units according to the updated data counts, wherein a number of the first updated logical units is less than a number of the updated logical units,
   wherein the memory management circuit is further configured to load at least one first logical-physical mapping table corresponding to the first updated logical units from the plurality of logical-physical mapping tables,
   wherein the memory management circuit is further configured to update mapping information in the first logical-physical mapping table according to mapping information of the first updated logical units in the physical-logical mapping table.

8. The memory controlling circuit unit according to claim 7, wherein
   the memory management circuit is further configured to clear mapping information of the first updated logical units in the physical-logical mapping table, and retain mapping information of other updated logical units excluding the first updated logical units in the physical-logical mapping table, and store the updated first logical-physical mapping table back to the rewritable non-volatile memory module.

9. The memory controlling circuit unit according to claim 7, wherein a first updated data count of the first updated logical units in the updated data counts is greater than a first threshold.

10. The memory controlling circuit unit according to claim 7, wherein a first updated data count of the first updated logical units in the updated data counts is less than a second threshold.

11. The memory controlling circuit unit according to claim 7, wherein in operation of selecting the first updated logical units from the updated logical units,
the memory management circuit is further configured to sort the updated data counts, determine a third threshold according to the updated data counts, and divide the updated data counts into at least one second updated data count and at least one third updated data count according to the third threshold,
wherein the second updated data count is greater than the third threshold and the third updated data count is not greater than the third threshold.

12. The memory controlling circuit unit according to claim 11, wherein in operation of selecting the first updated logical units from the updated logical units,
the memory management circuit is further configured to identify at least one second updated logical unit of the updated logical units corresponding to the second updated data count as the first updated logical units, or identify at least one third updated logical unit of the updated logical units corresponding to the third updated data count as the first updated logical units.

13. A memory storage device, comprising:
a connection interface unit, coupled to a host system;
a rewritable non-volatile memory module, wherein the rewritable non-volatile memory module has a plurality of physical erasing units, a plurality of logical-physical mapping tables are stored in the rewritable non-volatile memory module to record mapping information between a plurality of logical units and the plurality of physical erasing units; and
a memory controlling circuit unit, coupled to the connection interface unit and the rewritable non-volatile memory module,
wherein the memory controlling circuit unit is configured to establish a physical-logical mapping table, wherein the physical-logical mapping table records mapping information between at least one active physical erasing unit of the plurality of physical erasing units and a plurality of updated logical units of the plurality of logical units,
wherein the memory controlling circuit unit is further configured to calculate, according to the physical-logical mapping table, a plurality of updated data counts of the updated logical units in the active physical erasing unit respectively,
wherein the memory controlling circuit unit is further configured to select first updated logical units from the updated logical units according to the updated data counts, wherein a number of the first updated logical units is less than a number of the updated logical units,
wherein the memory controlling circuit unit is further configured to load at least one first logical-physical mapping table corresponding to the first updated logical units from the plurality of logical-physical mapping tables,
wherein the memory controlling circuit unit is further configured to update mapping information in the first logical-physical mapping table according to mapping information of the first updated logical units in the physical-logical mapping table.

14. The memory storage device according to claim 13, wherein
the memory controlling circuit unit is further configured to clear mapping information of the first updated logical units in the physical-logical mapping table, and retain mapping information of other updated logical units excluding the first updated logical units in the physical-logical mapping table, and store the updated first logical-physical mapping table back to the rewritable non-volatile memory module.

15. The memory storage device according to claim 13, wherein a first updated data count of the first updated logical units in the updated data counts is greater than a first threshold.

16. The memory storage device according to claim 13, wherein a first updated data count of the first updated logical units in the updated data counts is less than a second threshold.

17. The memory storage device according to claim 13, wherein in operation of selecting the first updated logical units from the updated logical units,
the memory controlling circuit unit is further configured to sort the updated data counts, and determine a third threshold according to the updated data counts.

18. The memory storage device according to claim 17, wherein in operation of selecting the first updated logical units from the updated logical units,
the memory controlling circuit unit is further configured to sort the updated data counts, determine a third threshold according to the plurality of sorted updated data counts, and divide the updated data counts into at least one second updated data count and at least one third updated data count according to the third threshold,
wherein the second updated data count is greater than the third threshold and the third updated data count is not greater than the third threshold.

19. A mapping table updating method for a rewritable non-volatile memory module, wherein the rewritable non-volatile memory module has a plurality of physical erasing units, a plurality of logical-physical mapping tables are stored in the rewritable non-volatile memory module to record mapping information between a plurality of logical units and the plurality of physical erasing units, and the mapping table updating method comprising:
establishing a physical-logical mapping table, wherein the physical-logical mapping table records mapping information between at least one active physical erasing unit of the plurality of physical erasing units and a plurality of updated logical units of the plurality of logical units;
calculating, according to the physical-logical mapping table, a plurality of updated data counts of the updated logical units in the active physical erasing unit respectively;
selecting first updated logical units from the updated logical units according to the updated data counts, wherein a number of the first updated logical units is less than a number of the updated logical units and a first updated data count of the first updated logical units in the updated data counts is greater than a first threshold;

loading at least one first logical-physical mapping table corresponding to the first updated logical units from the plurality of logical-physical mapping tables;

updating mapping information in the first logical-physical mapping table according to mapping information of the first updated logical units in the physical-logical mapping table;

clearing mapping information of the first updated logical units in the physical-logical mapping table; and retaining mapping information of other updated logical units excluding the first updated logical units in the physical-logical mapping table.

* * * * *